No. 665,857. Patented Jan. 15, 1901.
B. J. ABBOTT.
HORSESHOE NAIL MACHINE.
(Application filed May 4, 1900.)
(No Model.) 24 Sheets—Sheet 3.
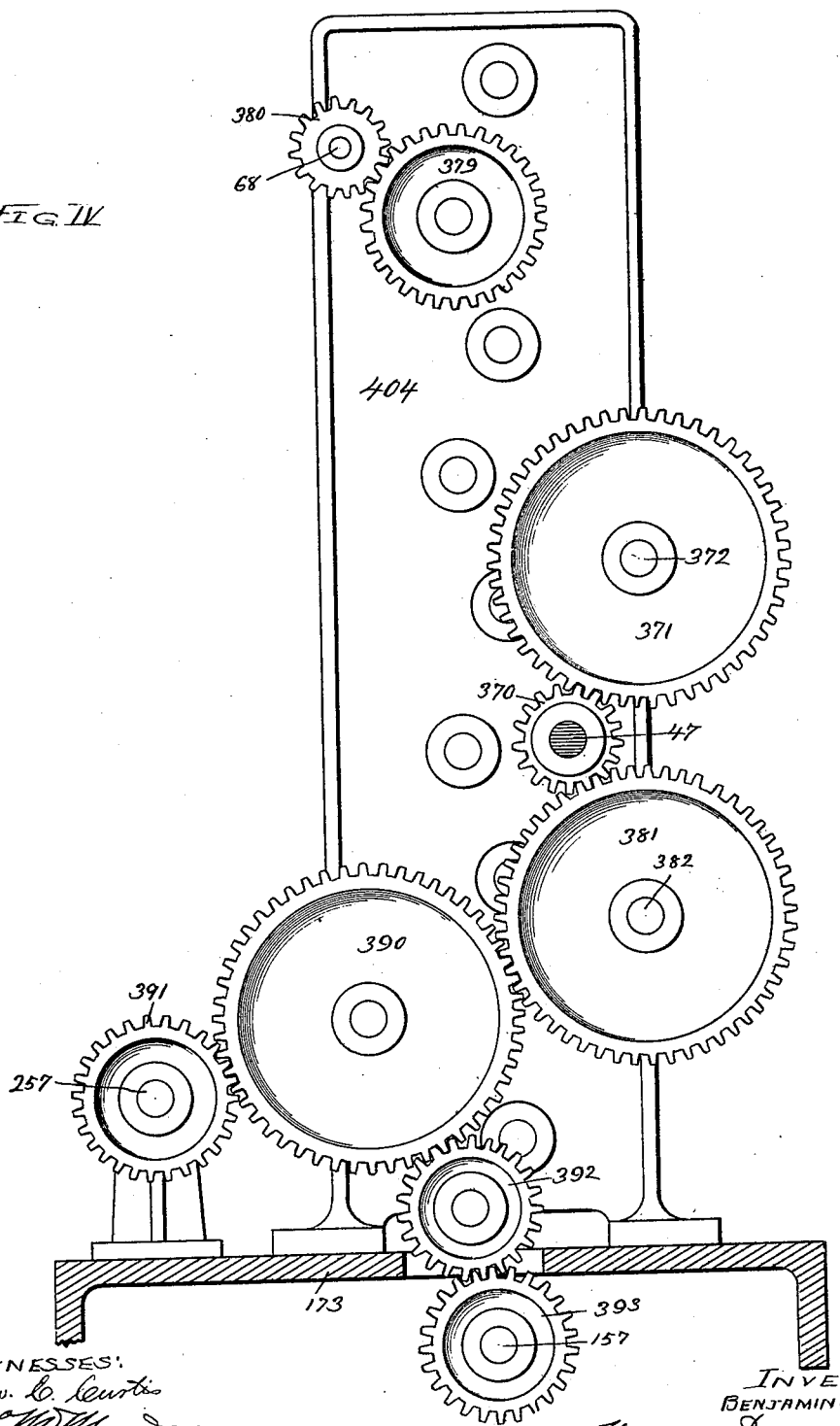

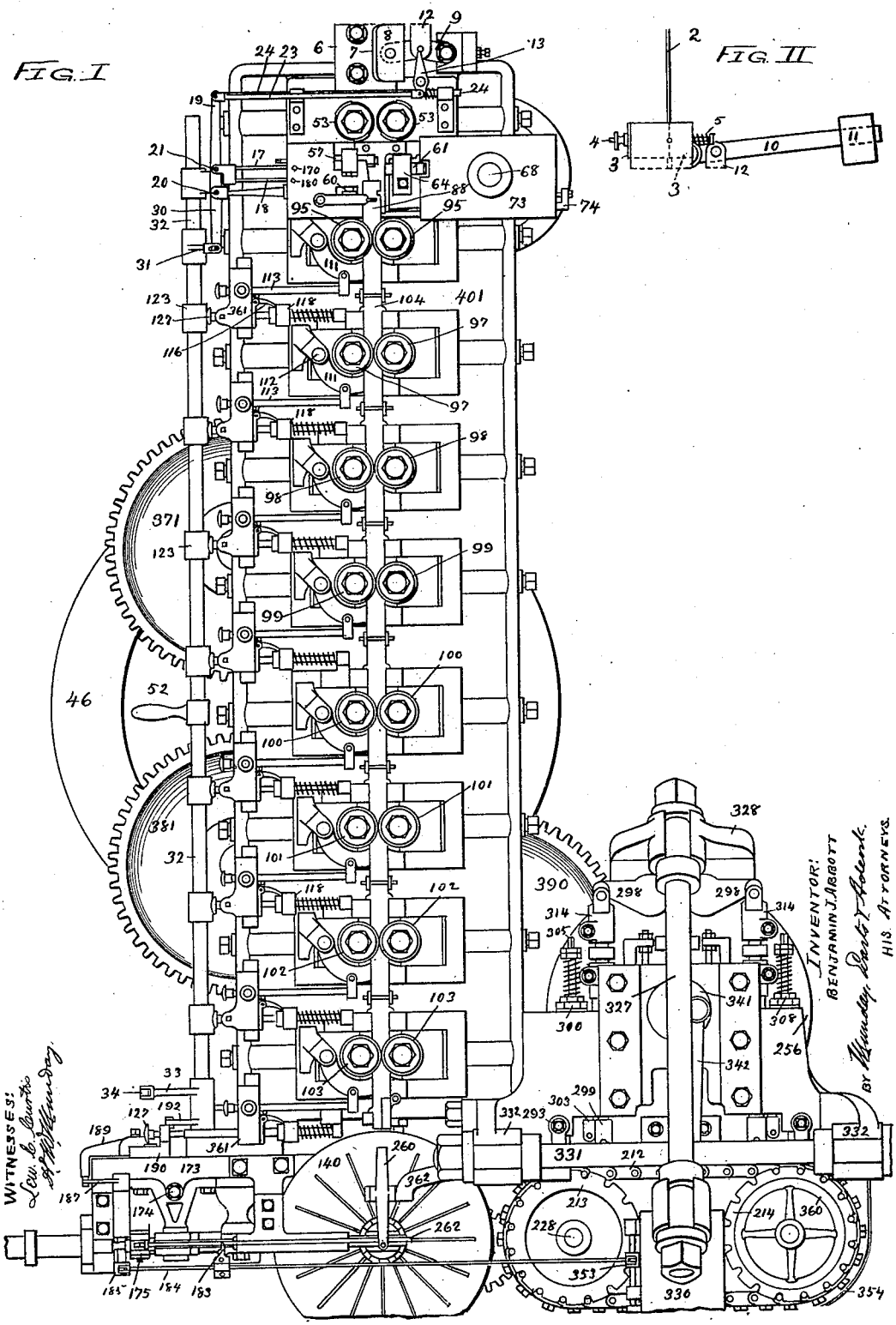

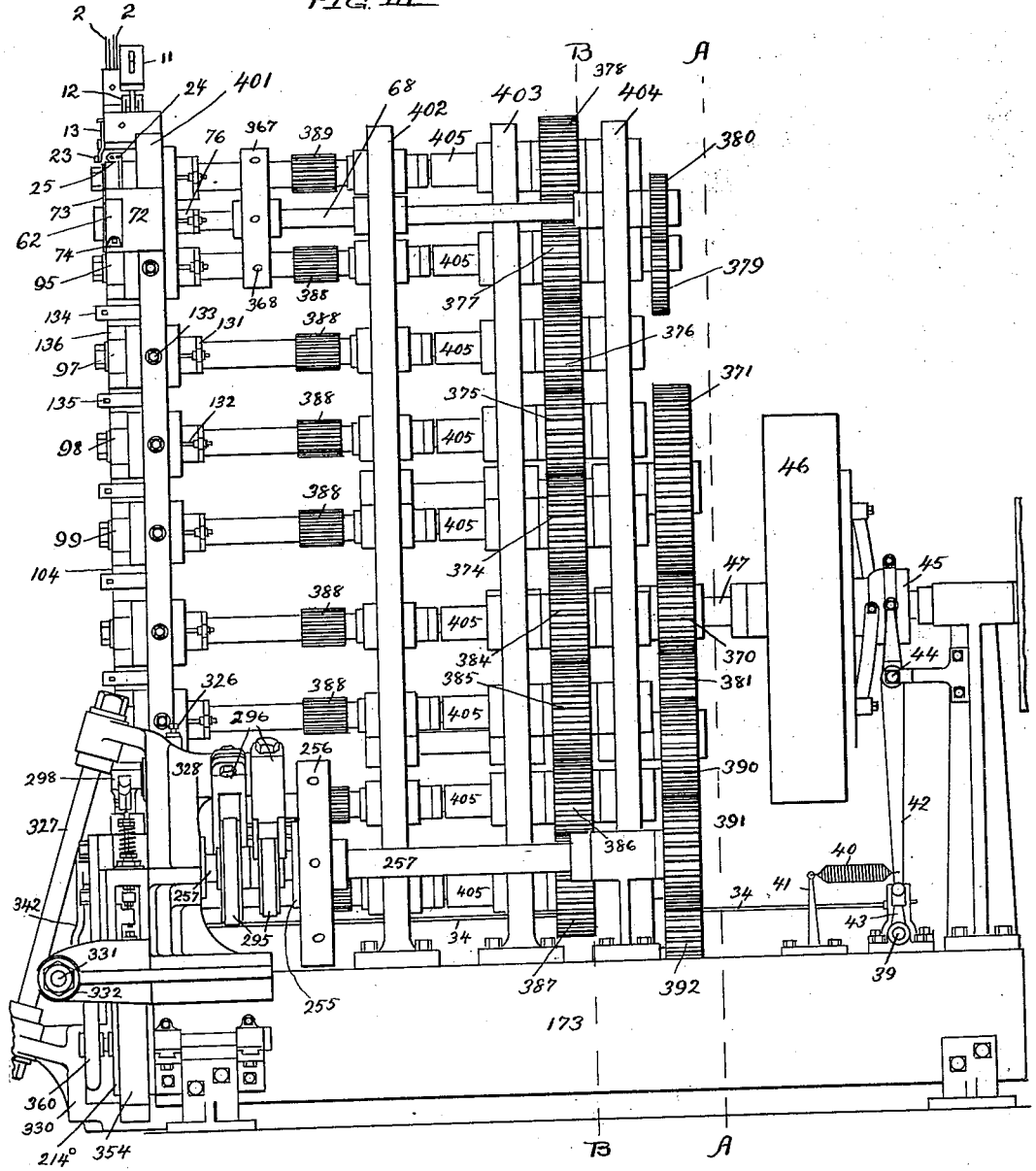

No. 665,857. Patented Jan. 15, 1901.
B. J. ABBOTT.
HORSESHOE NAIL MACHINE.
(Application filed May 4, 1900.)
(No Model.) 24 Sheets—Sheet 4.
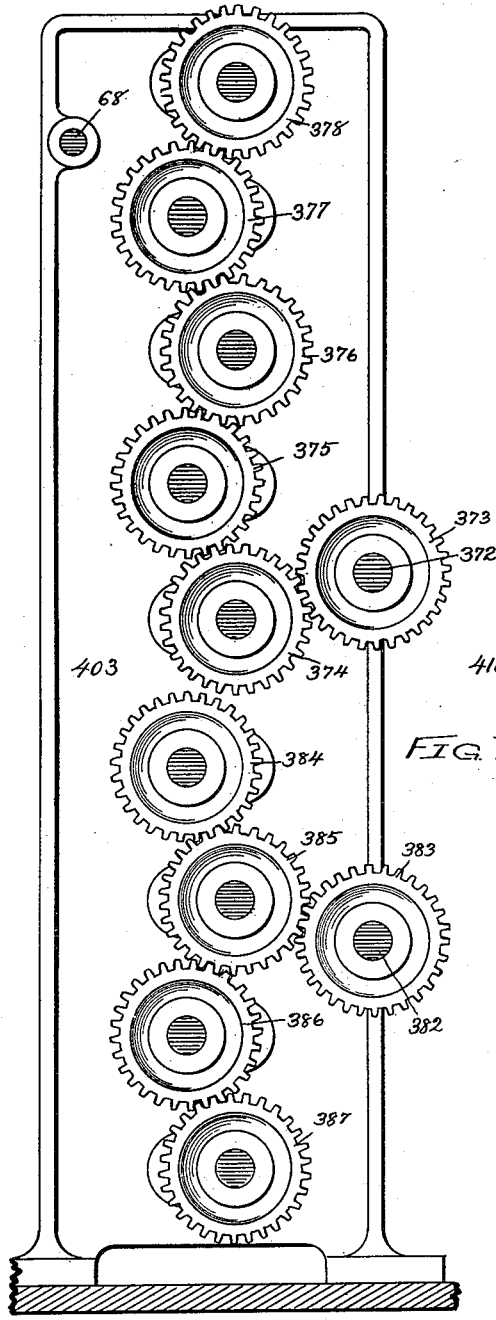
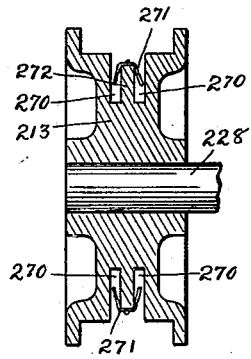
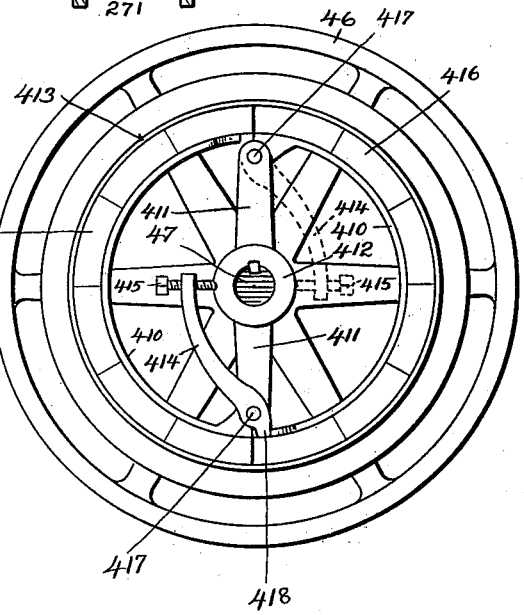
WITNESSES:
Lew. E. Curtis
H. W. Munday
INVENTOR:
BENJAMIN J. ABBOTT
BY Munday, Evarts & Adcock.
HIS ATTORNEYS

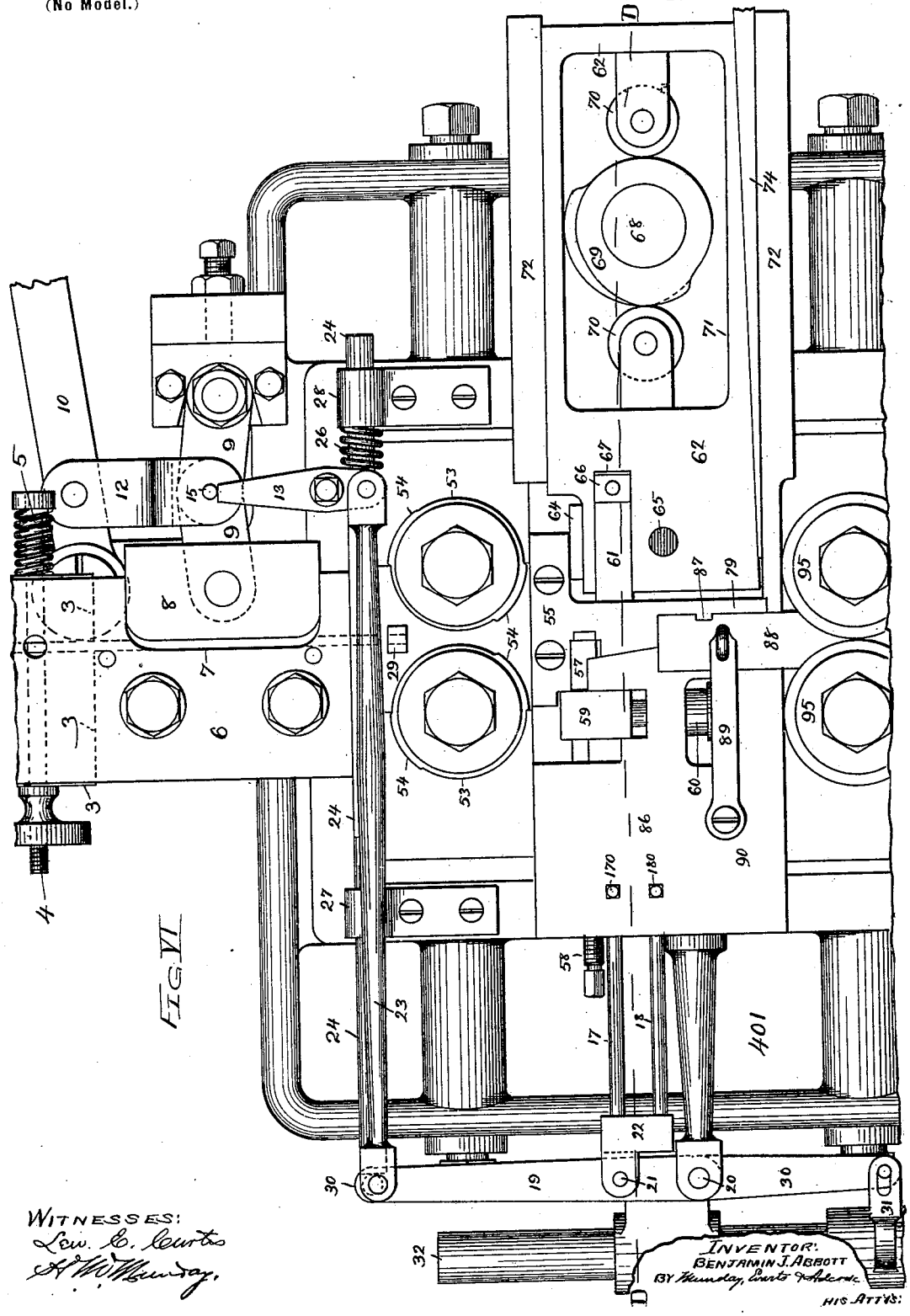

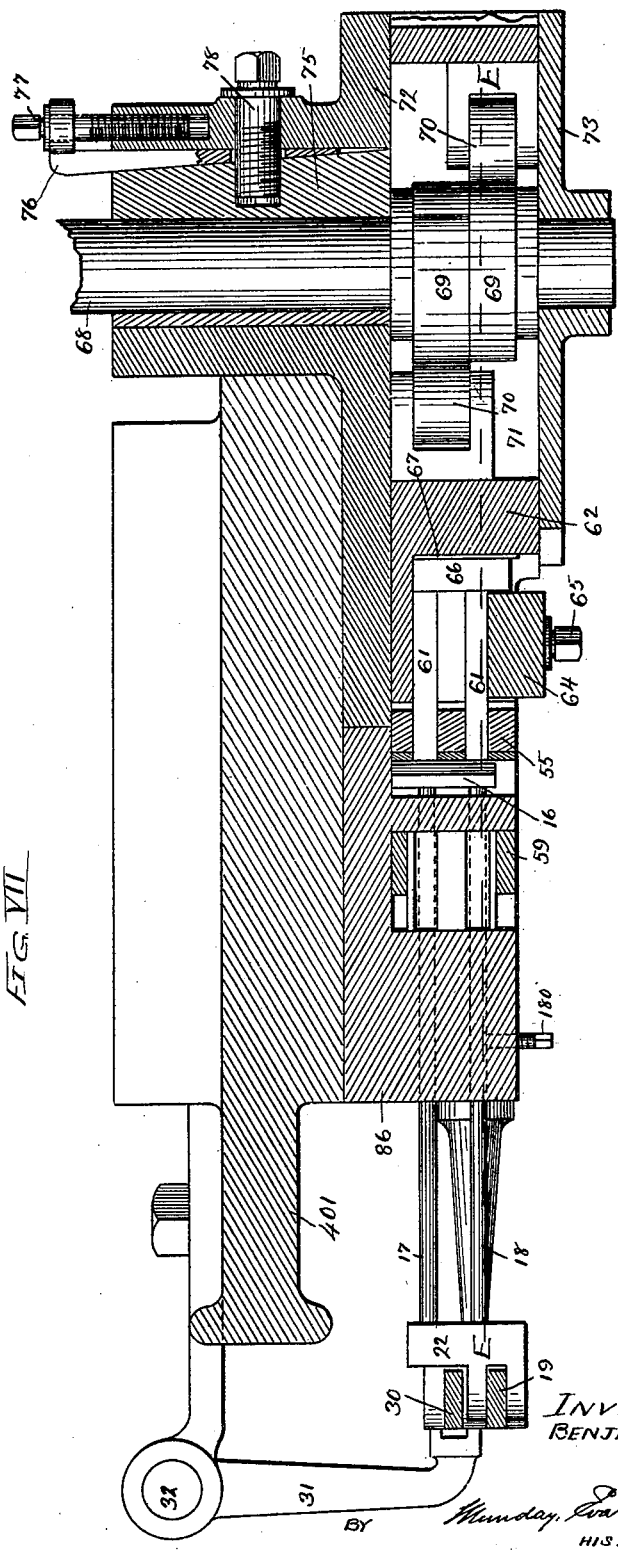

No. 665,857. Patented Jan. 15, 1901.
B. J. ABBOTT.
HORSESHOE NAIL MACHINE.
(Application filed May 4, 1900.)
(No Model.) 24 Sheets—Sheet 7.
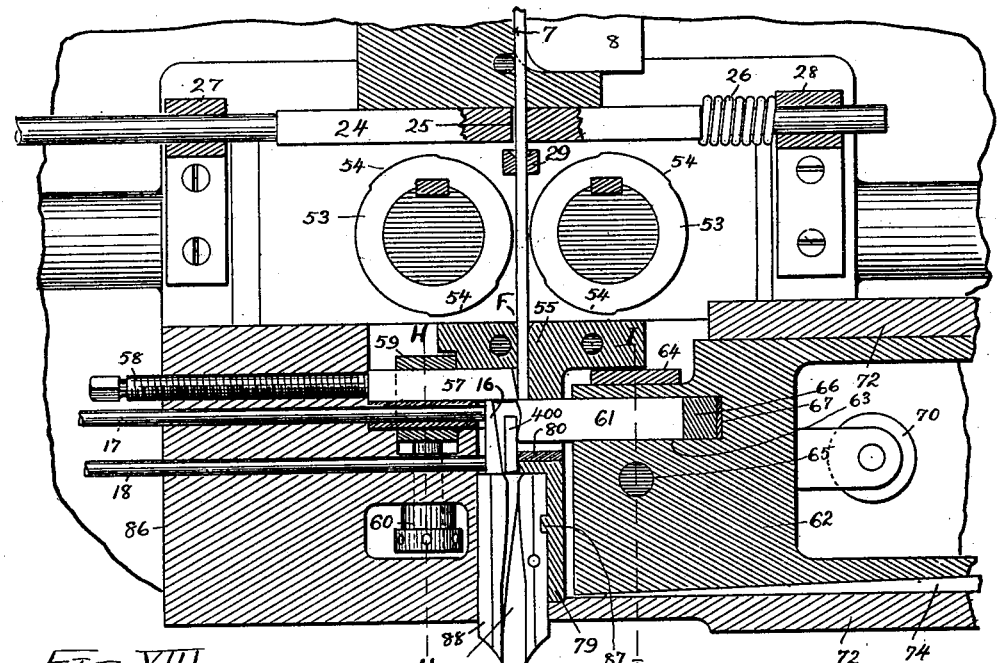
Fig. VIII.
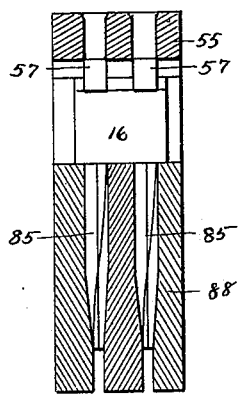
Fig. IX.
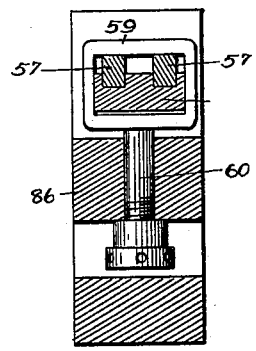
Fig. XI.
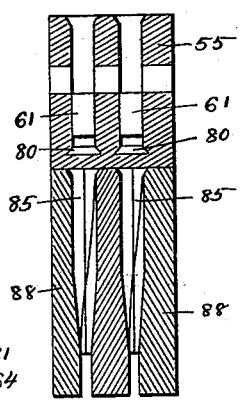
Fig. X.
Fig. XII.
WITNESSES:
Lew. E. Curtis
H. W. Munday
INVENTOR:
BENJAMIN J. ABBOTT
BY Munday, Evarts & Adcock.
HIS ATTORNEYS.

No. 665,857. Patented Jan. 15, 1901.
B. J. ABBOTT.
HORSESHOE NAIL MACHINE.
(Application filed May 4, 1900.)
(No Model.) 24 Sheets—Sheet 8.
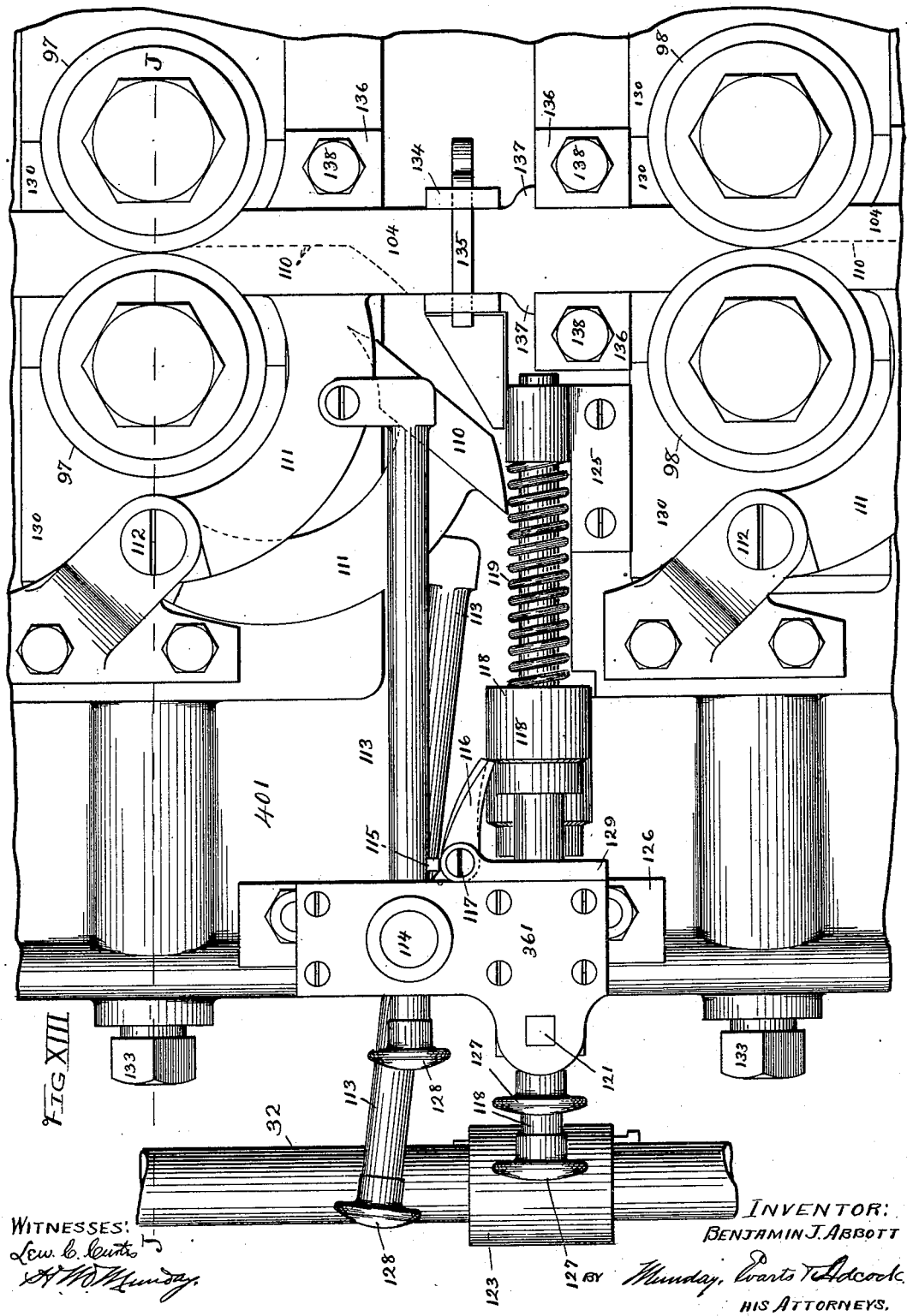

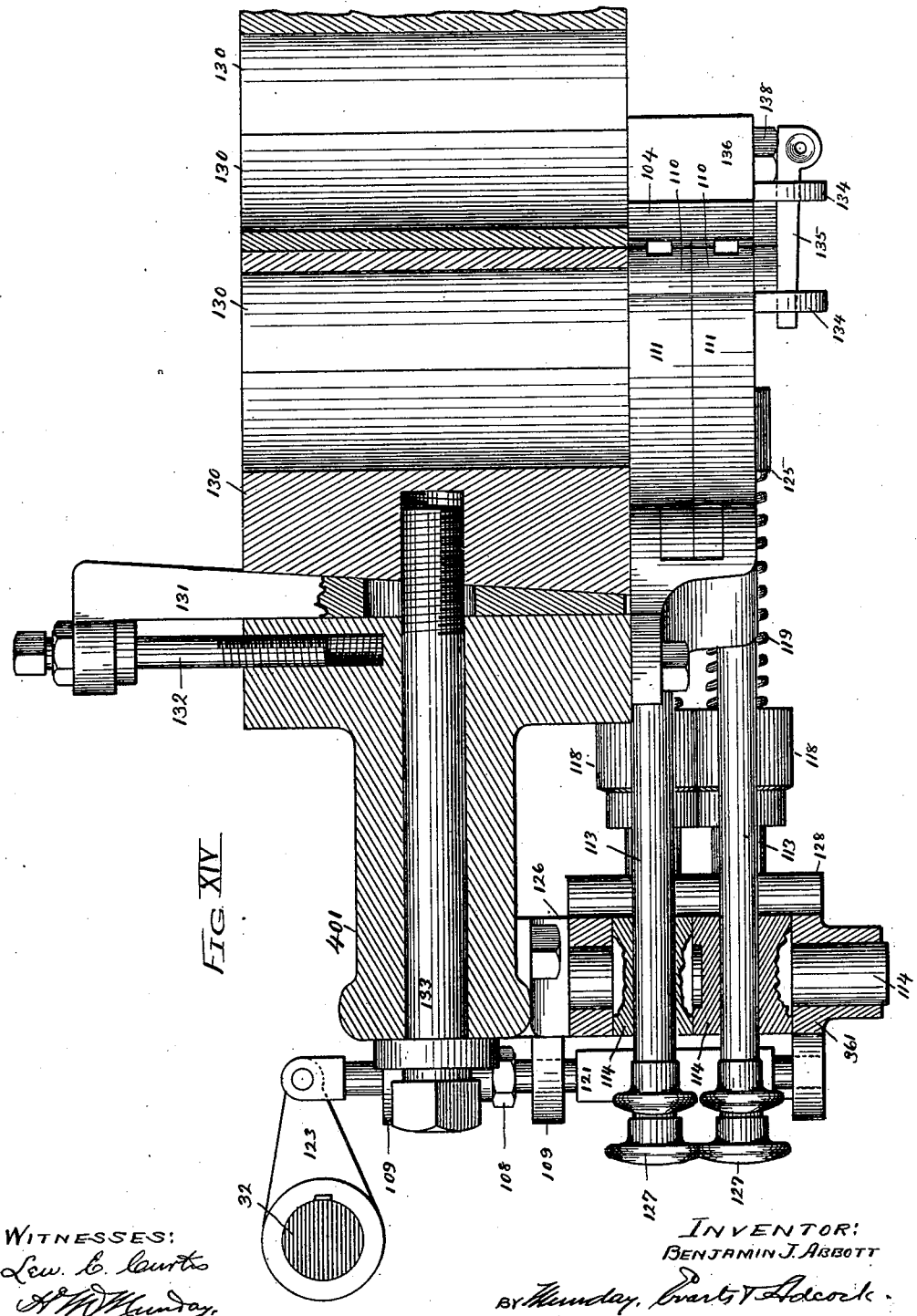

No. 665,857. Patented Jan. 15, 1901.
B. J. ABBOTT.
HORSESHOE NAIL MACHINE.
(Application filed May 4, 1900.)
(No Model.) 24 Sheets—Sheet 10.
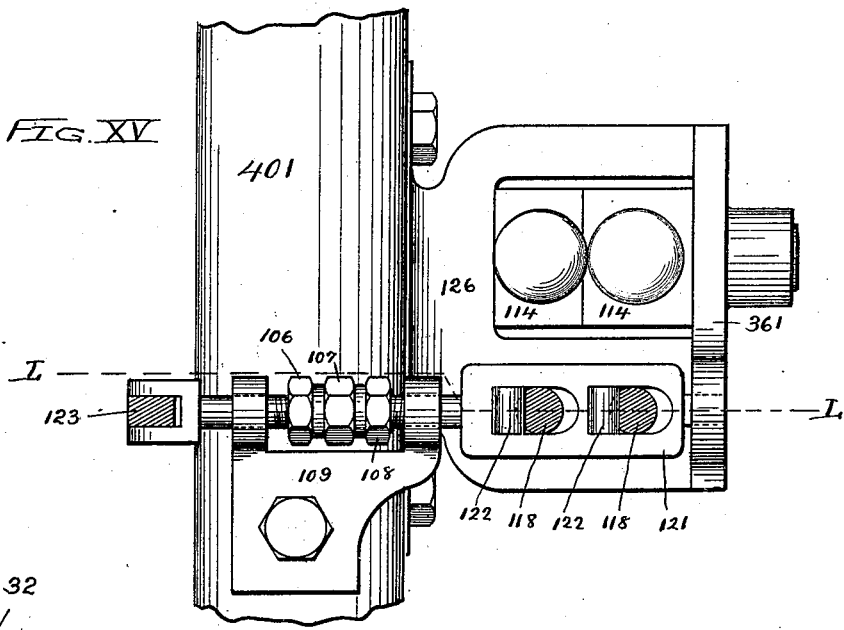
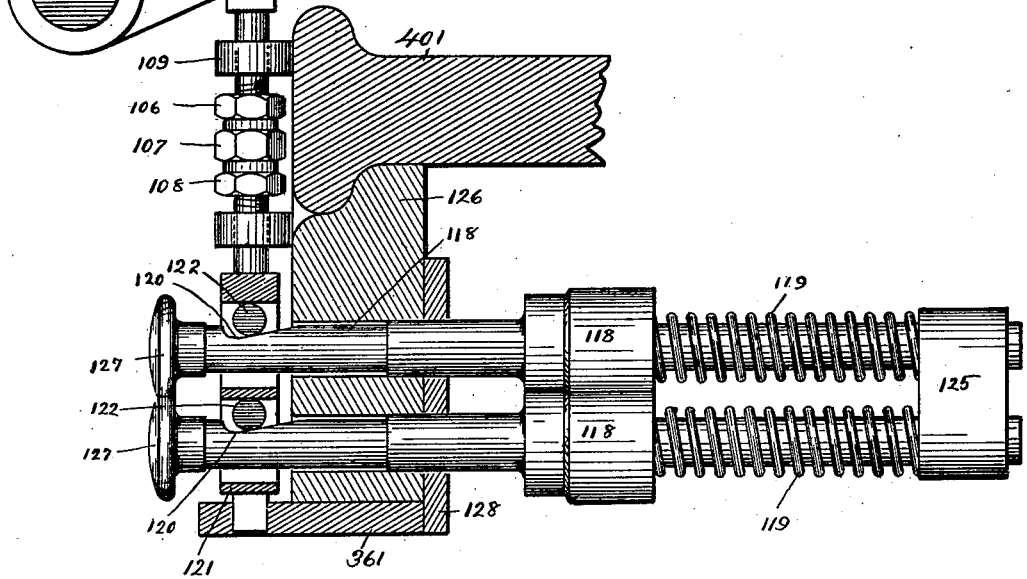
WITNESSES:
INVENTOR:
BENJAMIN J. ABBOTT
BY Munday, Evarts & Adcock
HIS ATTORNEYS.

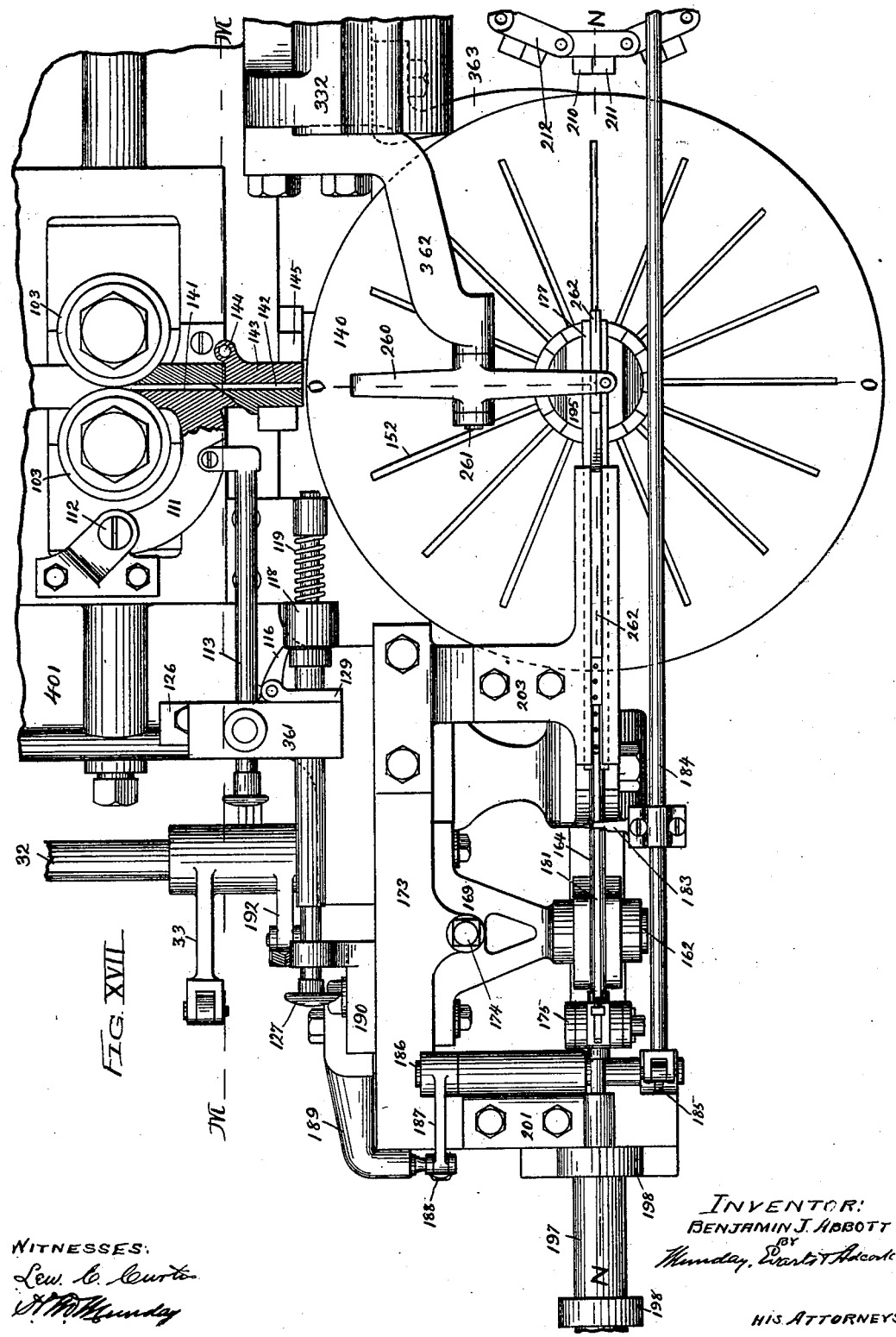

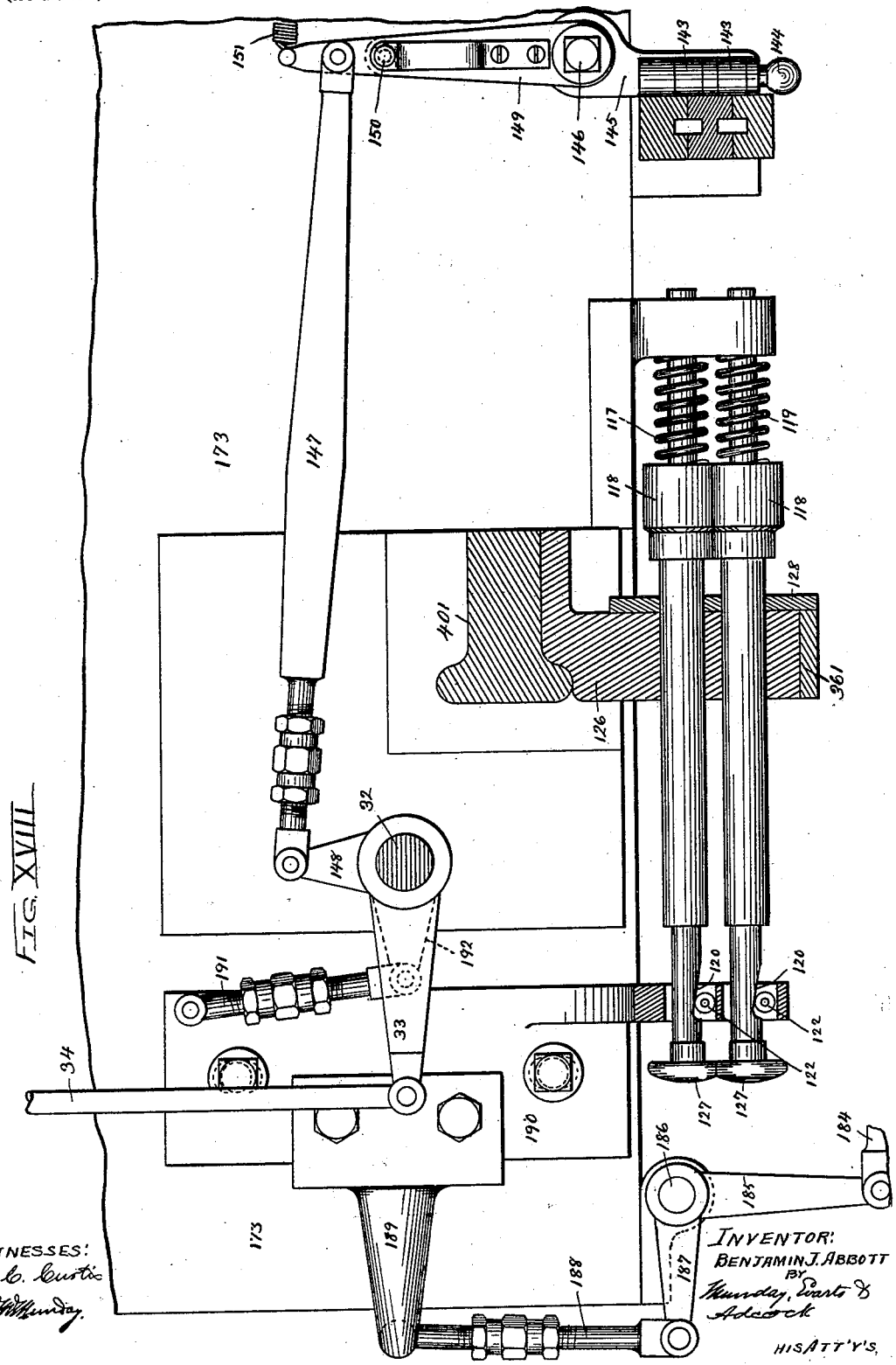

No. 665,857. Patented Jan. 15, 1901.
B. J. ABBOTT.
HORSESHOE NAIL MACHINE.
(Application filed May 4, 1900.)
(No Model.) 24 Sheets—Sheet 13.
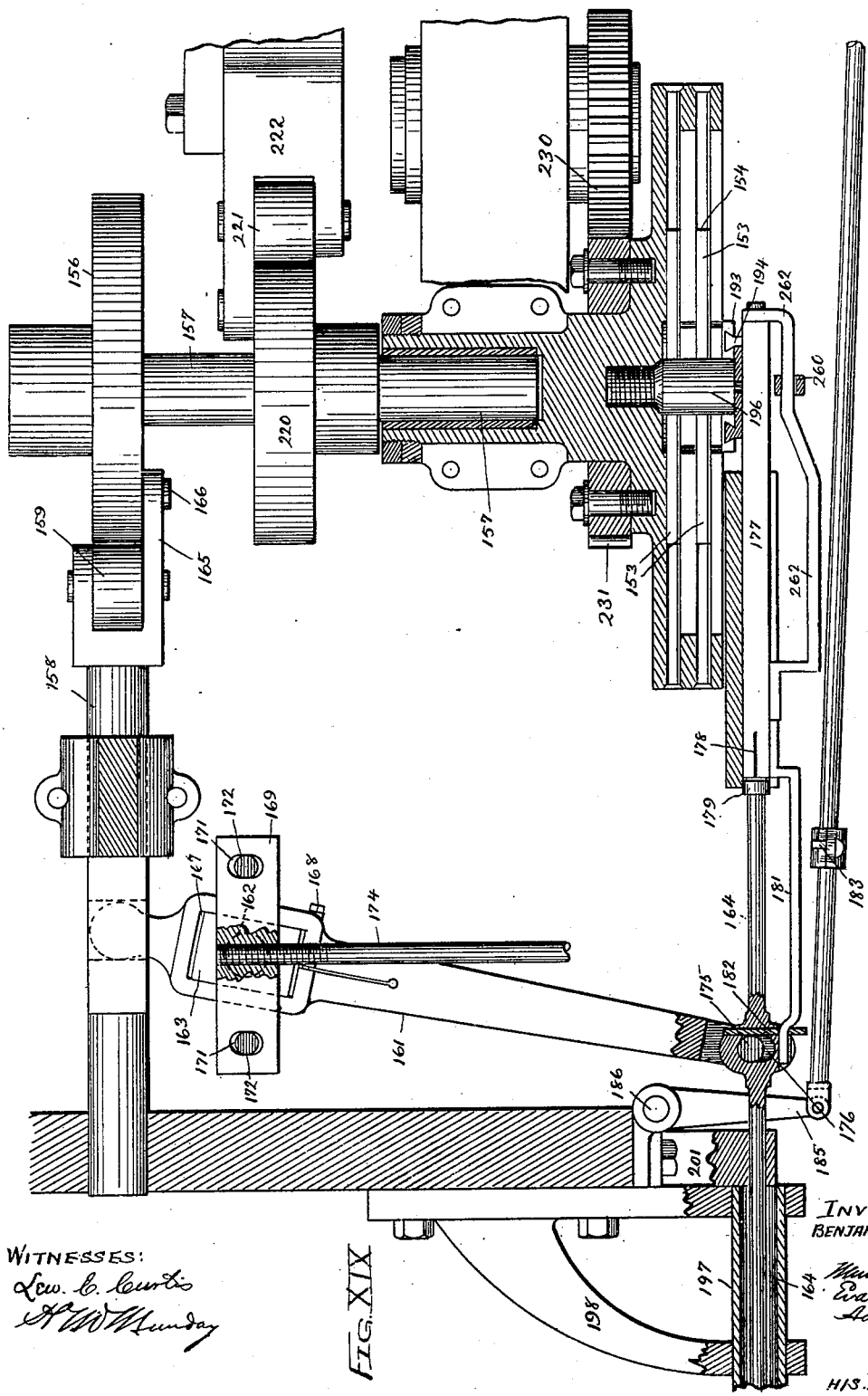

No. 665,857. Patented Jan. 15, 1901.
B. J. ABBOTT.
HORSESHOE NAIL MACHINE.
(Application filed May 4, 1900.)
(No Model.) 24 Sheets—Sheet 14.
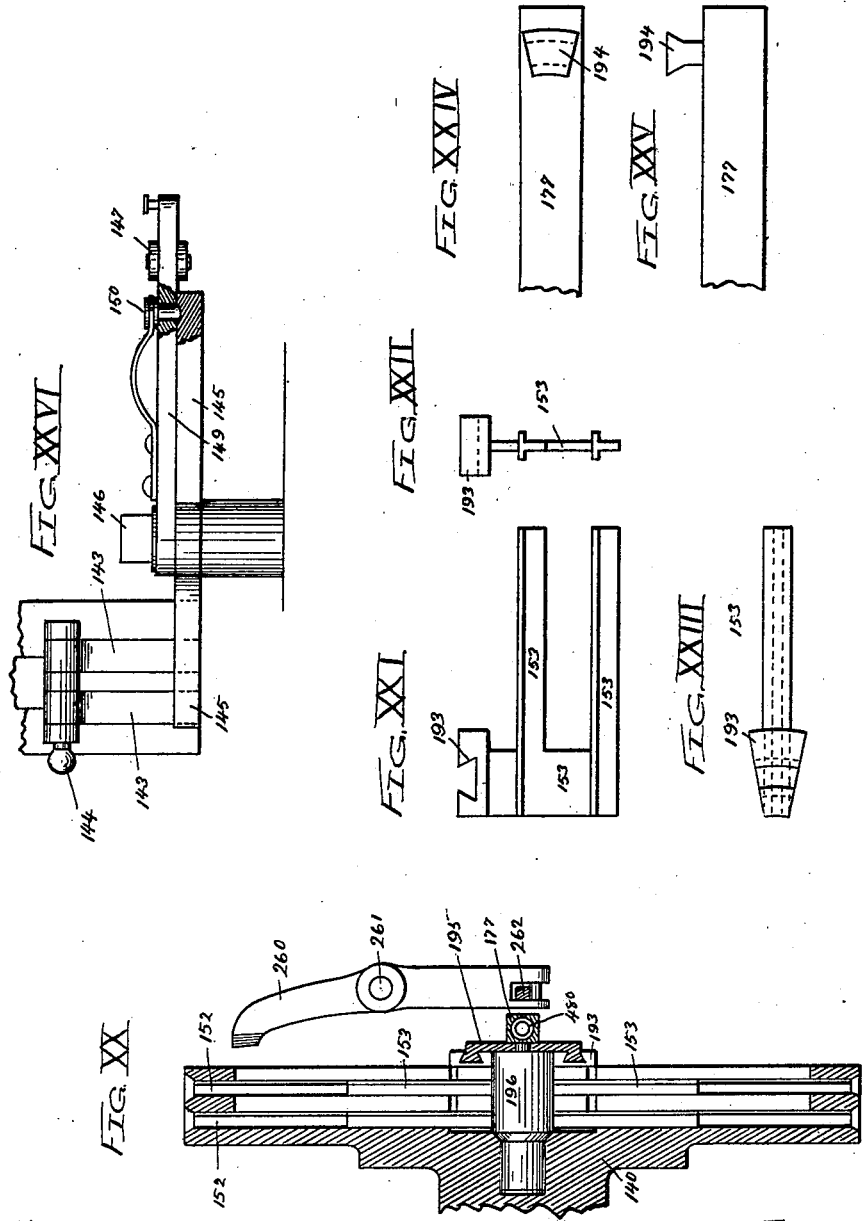
WITNESSES:
INVENTOR:
BENJAMIN J. ABBOTT
BY Munday, Evarts & Adcock.
HIS ATTORNEYS.

No. 665,857. Patented Jan. 15, 1901.
B. J. ABBOTT.
HORSESHOE NAIL MACHINE.
(Application filed May 4, 1900.)
(No Model.) 24 Sheets—Sheet 15.
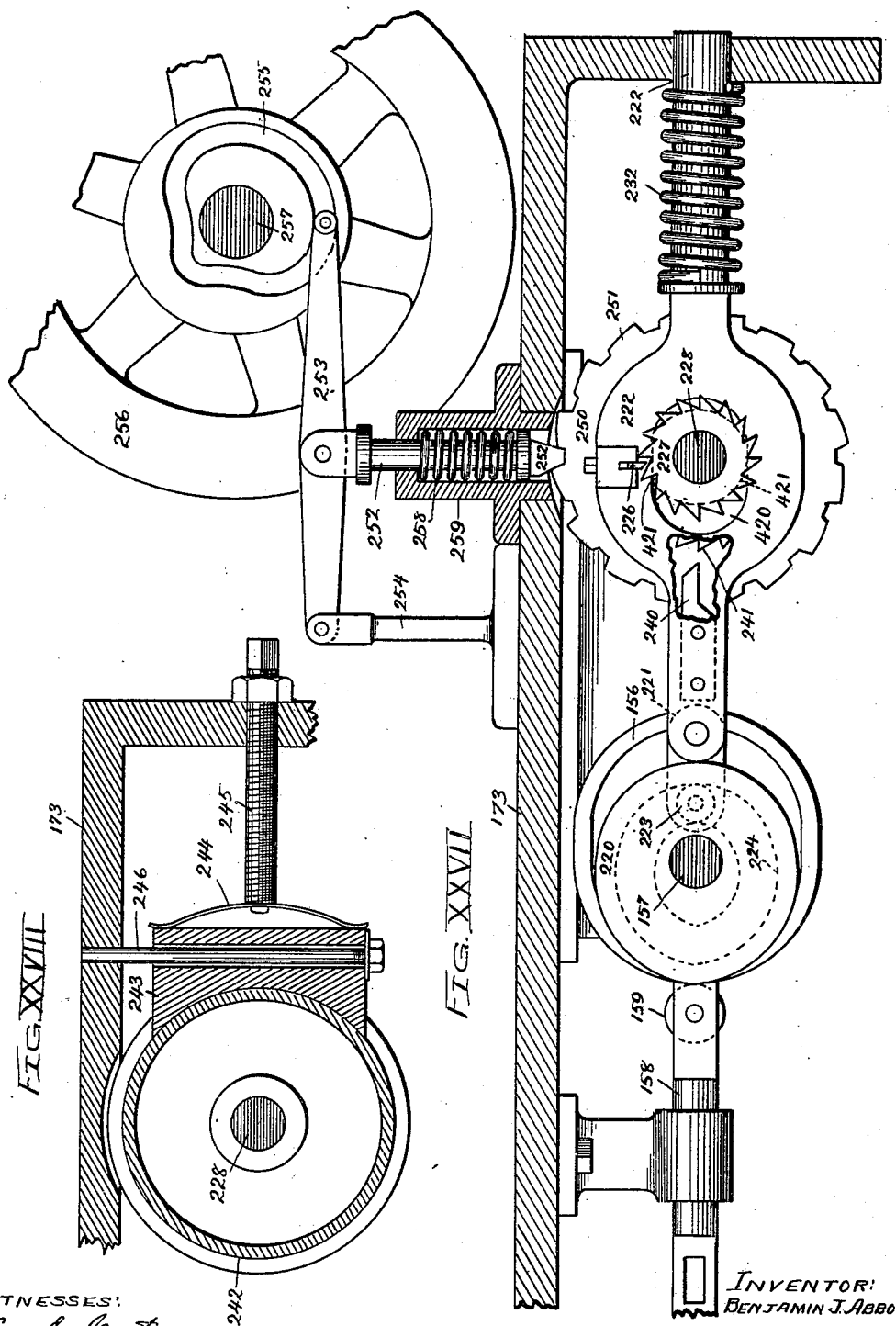
WITNESSES:
Lew. C. Curtis
H. W. Munday
INVENTOR:
BENJAMIN J. ABBOTT
BY Munday, Evarts & Adcock.
HIS ATTORNEYS.

No. 665,857. Patented Jan. 15, 1901.
B. J. ABBOTT.
HORSESHOE NAIL MACHINE.
(Application filed May 4, 1900.)
(No Model.) 24 Sheets—Sheet 16.
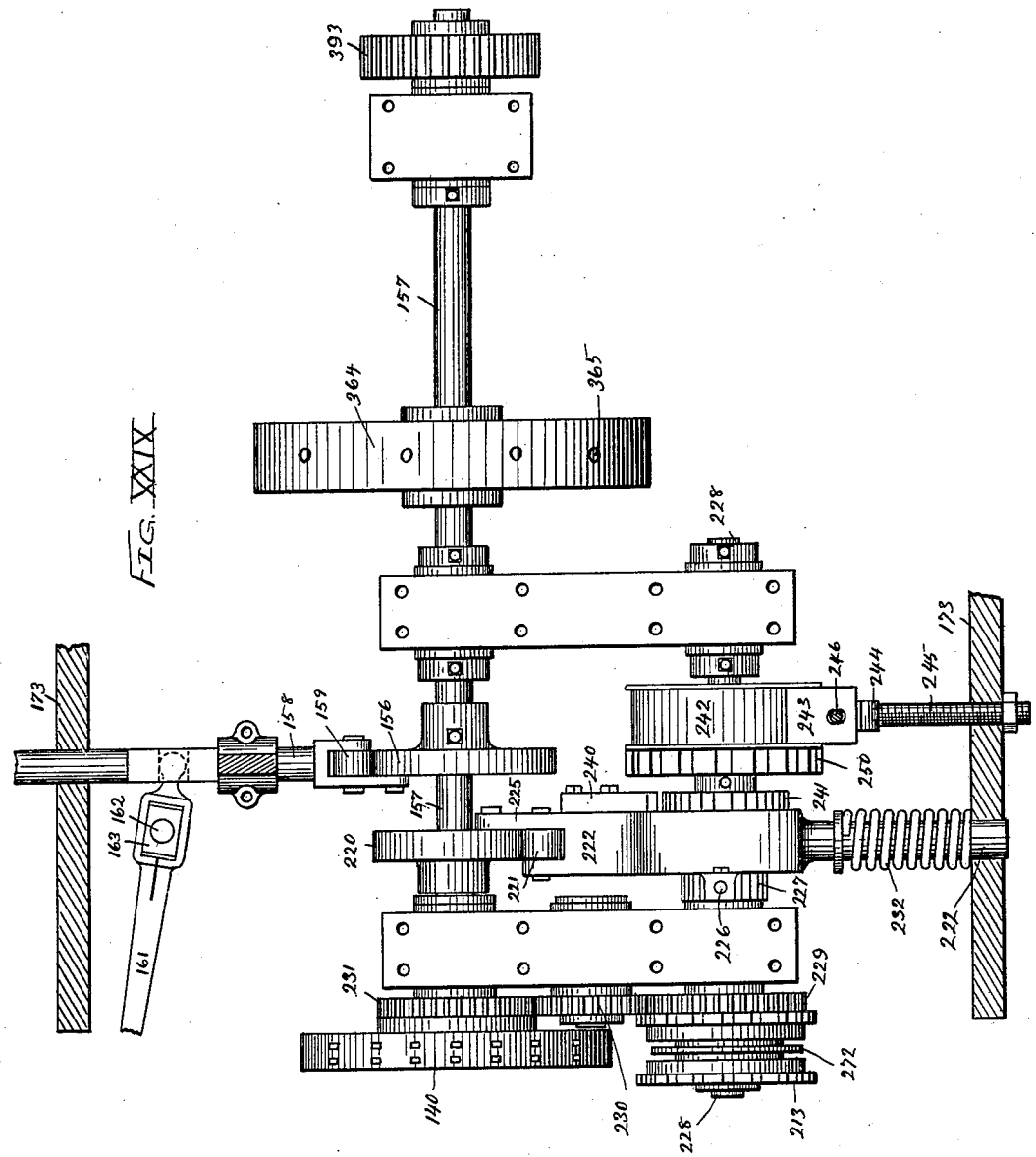

No. 665,857.　　　　　　　　　　　　　　　　Patented Jan. 15, 1901.
B. J. ABBOTT.
HORSESHOE NAIL MACHINE.
(Application filed May 4, 1900.)
(No Model.)　　　　　　　　　　　　　　　　24 Sheets—Sheet 17.
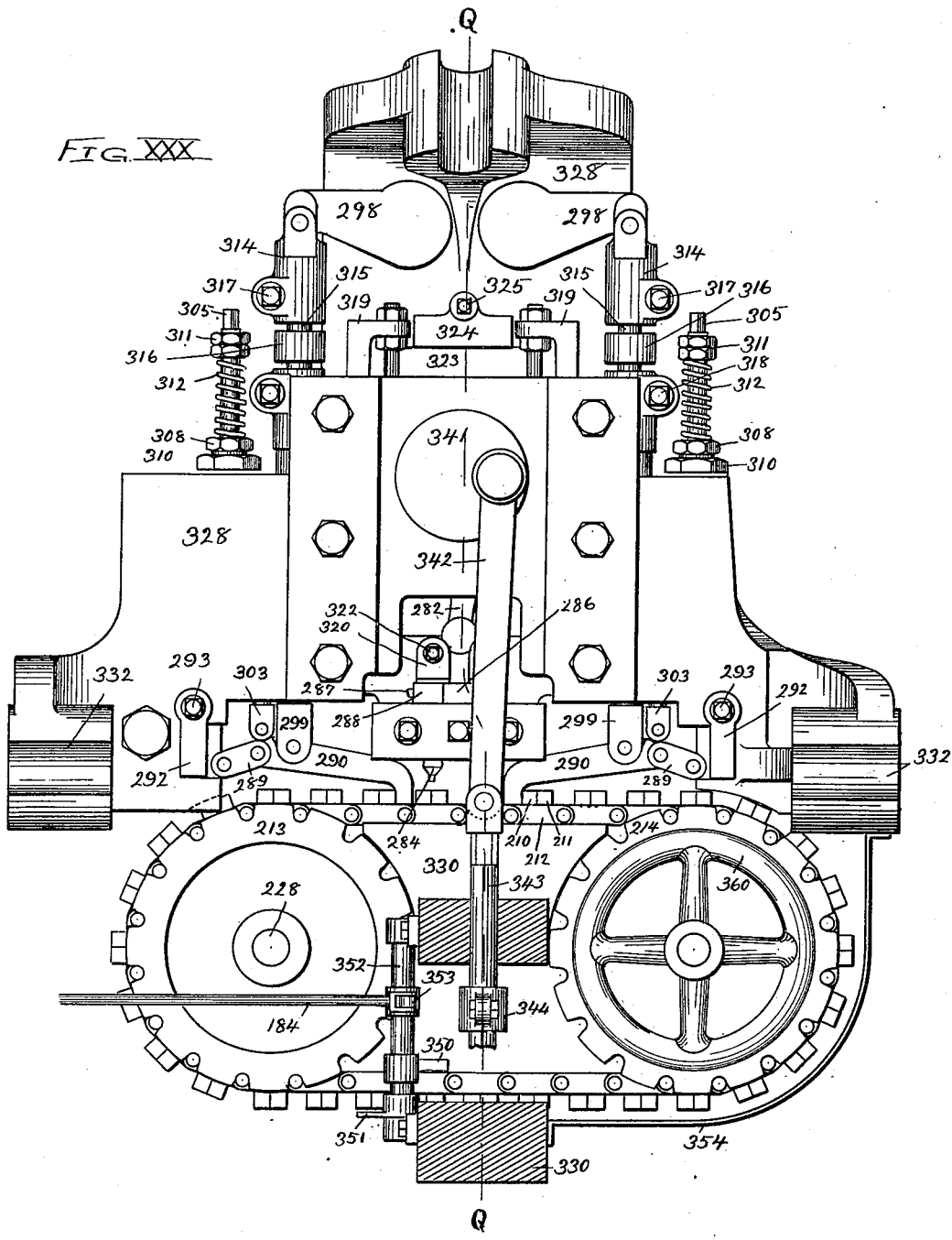
Fig. XXX
WITNESSES:
Lew. C. Curtis
H. W. Munday
INVENTOR:
BENJAMIN J. ABBOTT
BY Munday, Evarts & Adcock.
HIS ATTORNEYS

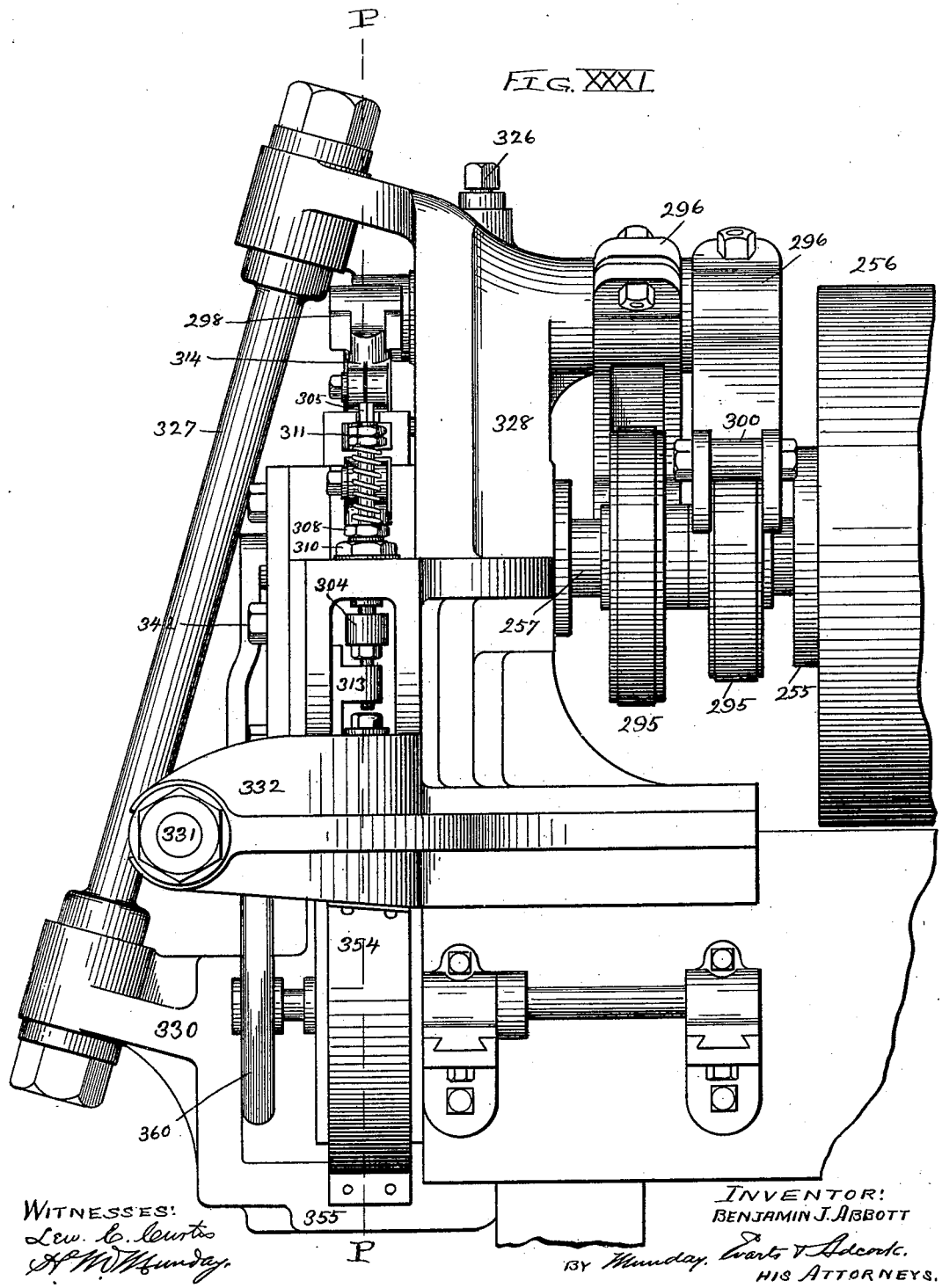

No. 665,857. Patented Jan. 15, 1901.
B. J. ABBOTT.
HORSESHOE NAIL MACHINE.
(Application filed May 4, 1900.)
(No Model.) 24 Sheets—Sheet 19.
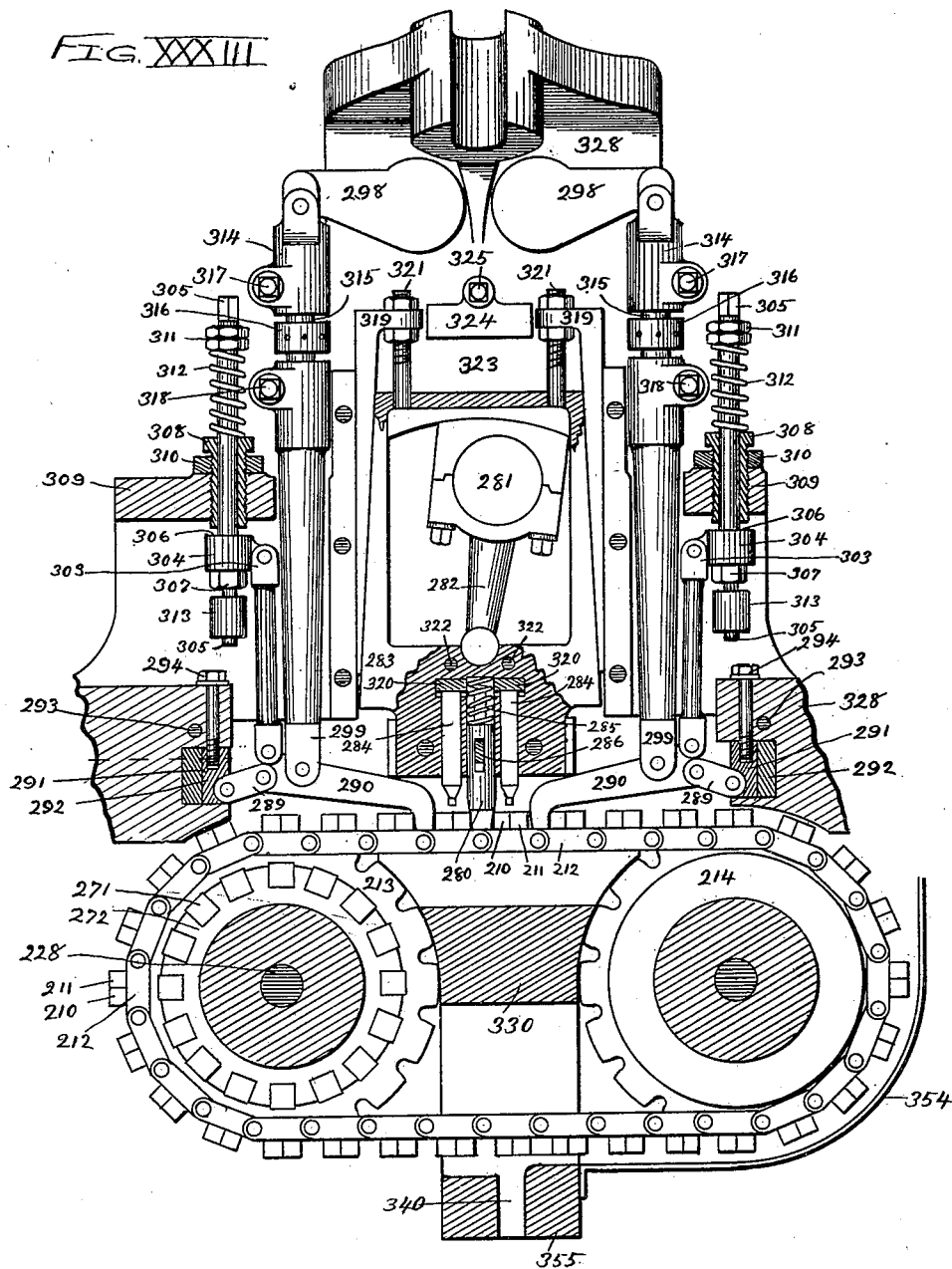
FIG. XXXIII
WITNESSES:
Lew. C. Curtis
A. W. Munday
INVENTOR:
BENJAMIN J. ABBOTT
BY Munday, Evarts & Adcock
HIS ATTORNEYS.

No. 665,857. Patented Jan. 15, 1901.
B. J. ABBOTT.
HORSESHOE NAIL MACHINE.
(Application filed May 4, 1900.)
(No Model.) 24 Sheets—Sheet 20.
FIG. XXXIV
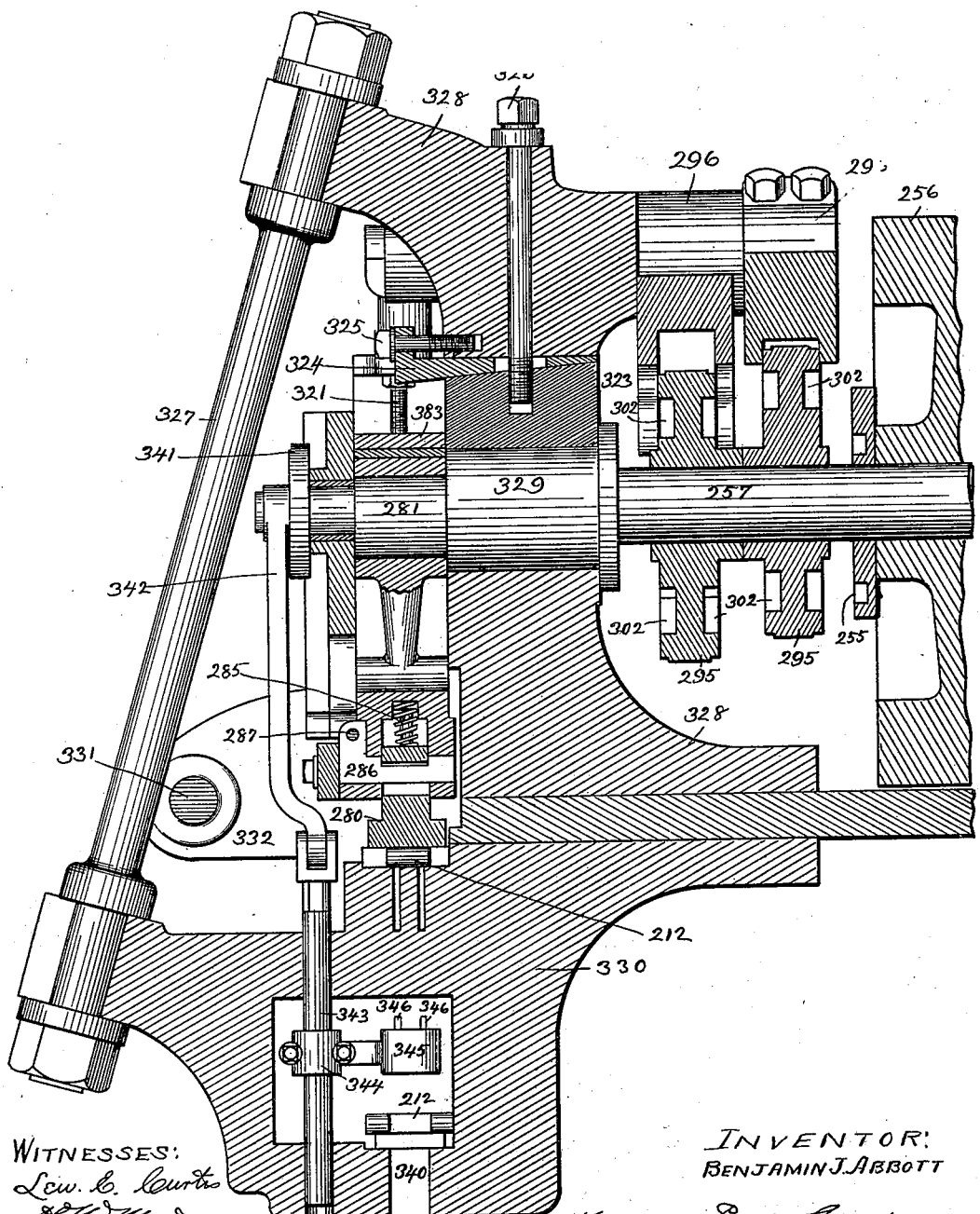

No. 665,857. Patented Jan. 15, 1901.
B. J. ABBOTT.
HORSESHOE NAIL MACHINE.
(Application filed May 4, 1900.)
(No Model.) 24 Sheets—Sheet 21.
FIG. XXXV
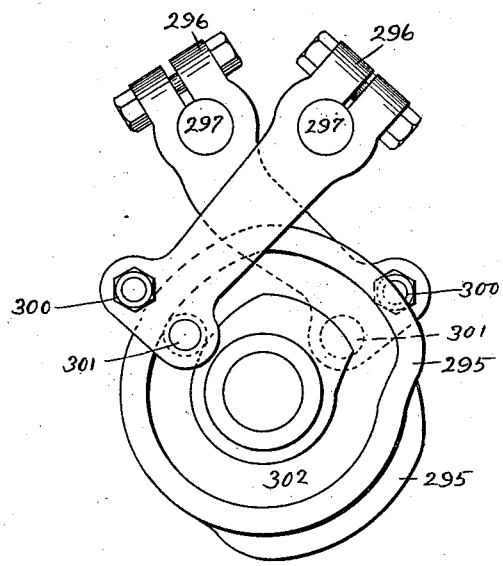
FIG. XXXVI
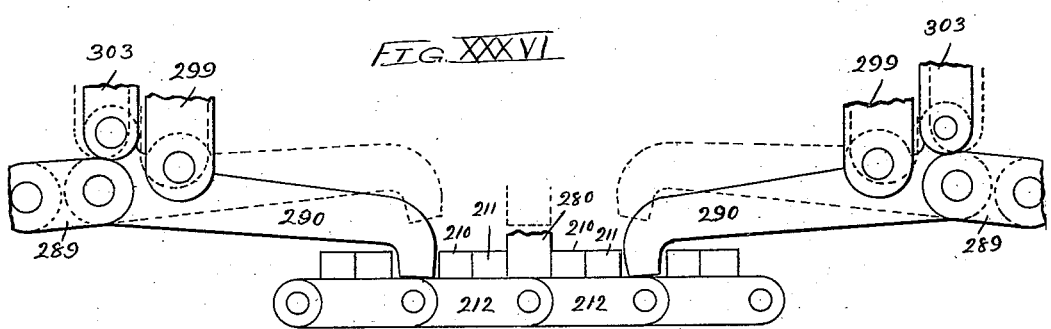
FIG. XXXVII
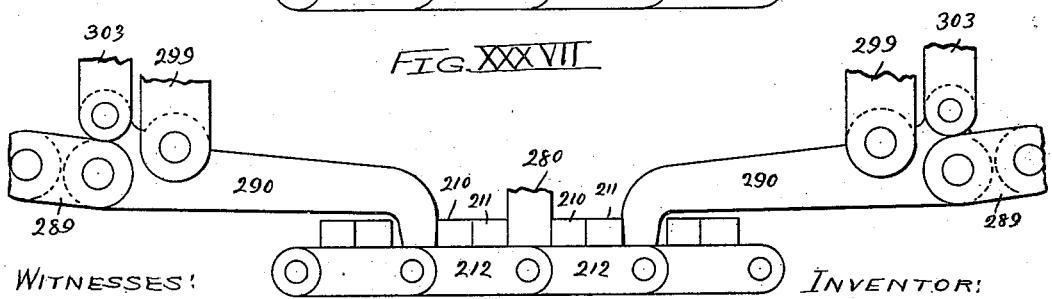
WITNESSES:
Lew. C. Curtis
H. W. Munday
INVENTOR:
BENJAMIN J. ABBOTT
BY Munday, Evarts & Adcock.
HIS ATTORNEYS.

No. 665,857. Patented Jan. 15, 1901.
B. J. ABBOTT.
HORSESHOE NAIL MACHINE.
(Application filed May 4, 1900.)
(No Model.) 24 Sheets—Sheet 22.
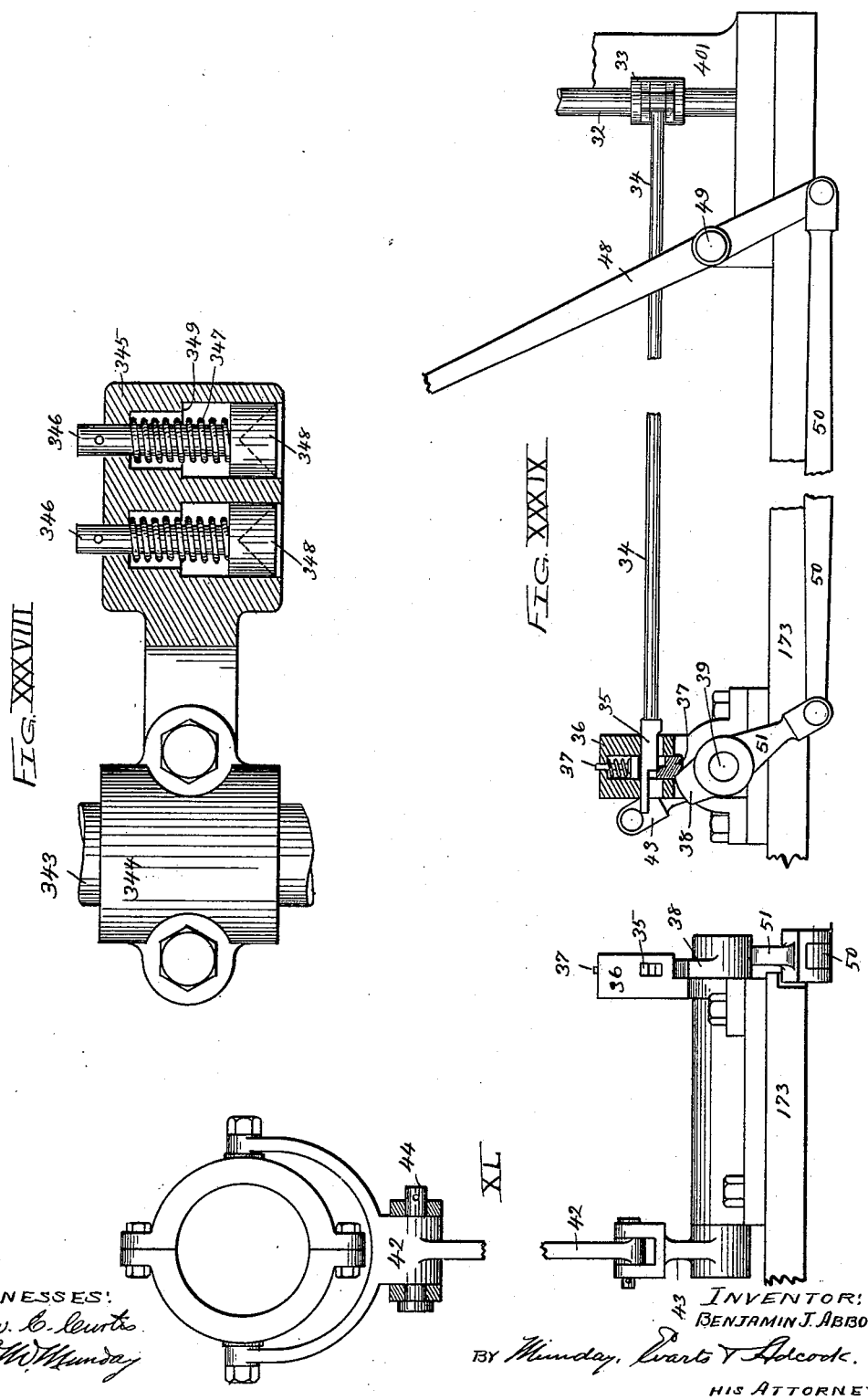
WITNESSES:
Lew. C. Curtis
H. W. Munday
INVENTOR:
BENJAMIN J. ABBOTT
BY Munday, Evarts & Adcock
HIS ATTORNEYS.

No. 665,857. Patented Jan. 15, 1901.
B. J. ABBOTT.
HORSESHOE NAIL MACHINE.
(Application filed May 4, 1900.)
(No Model.) 24 Sheets—Sheet 23.
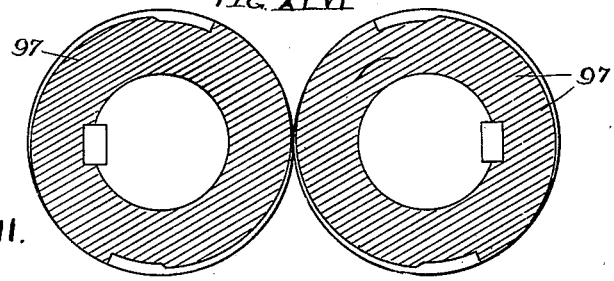
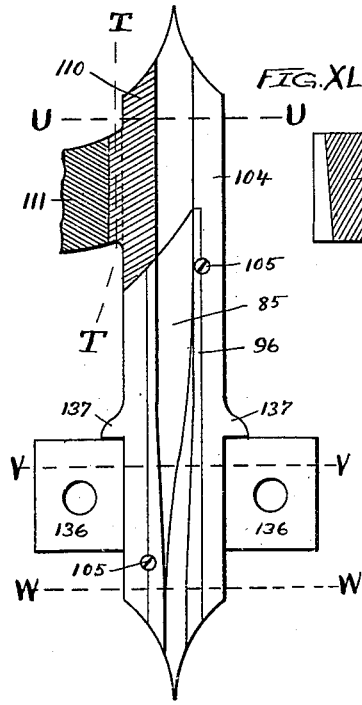
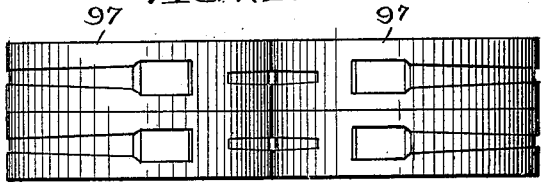
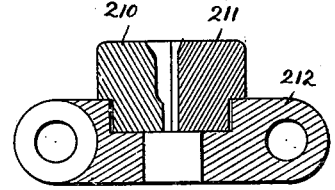
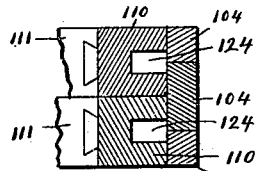
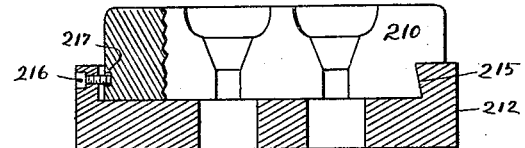
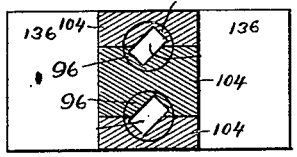
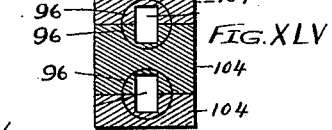
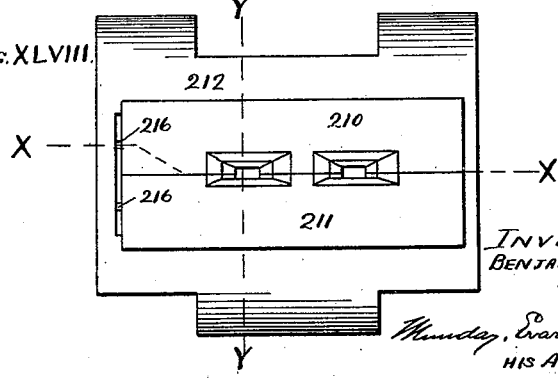
INVENTOR:
BENJAMIN J. ABBOTT
BY
Munday, Evarts & Adcock.
HIS ATTORNEYS
WITNESSES:
THE NORRIS PETERS CO., PHOTO-LITHO., WASHINGTON, D. C.

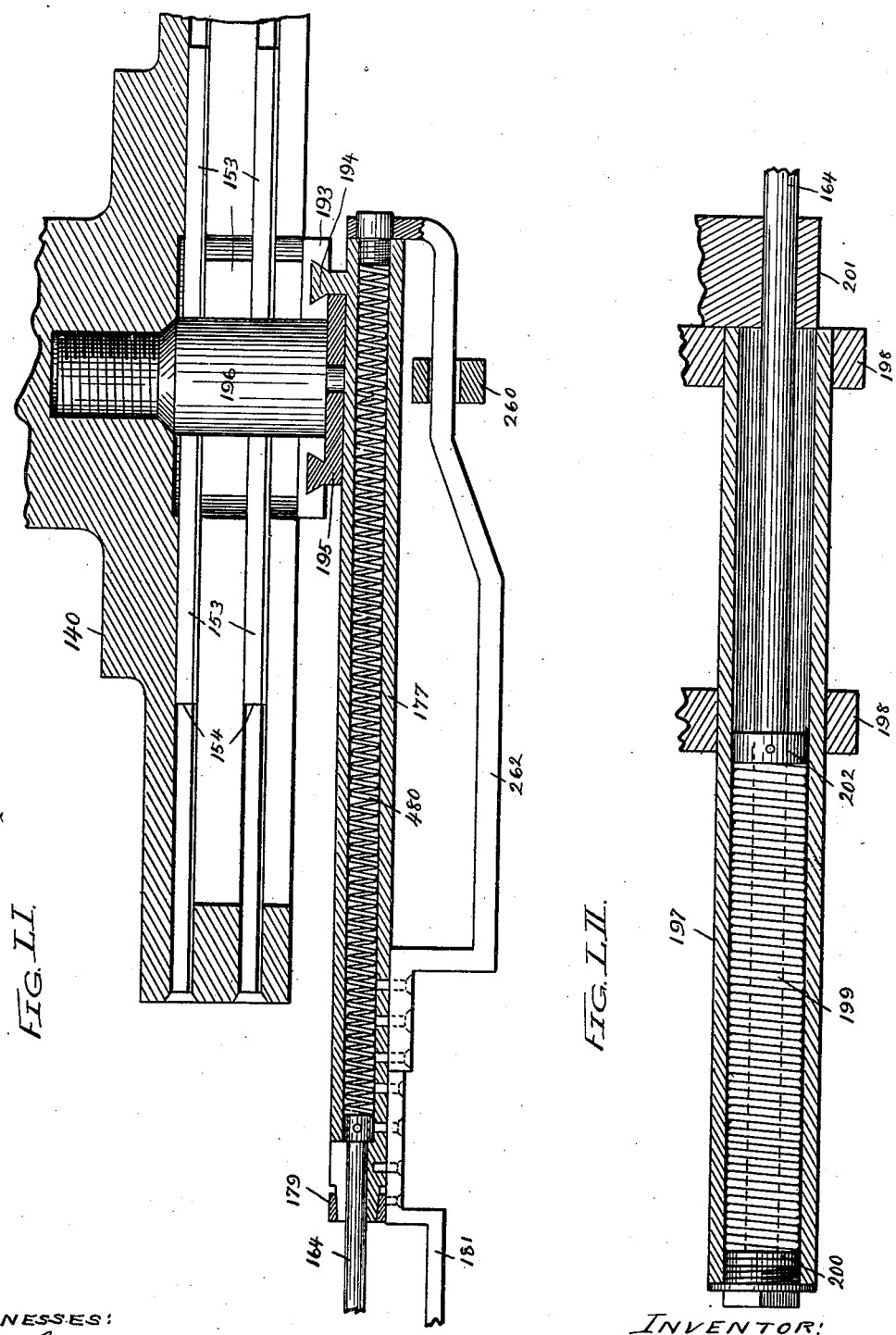

UNITED STATES PATENT OFFICE.

BENJAMIN J. ABBOTT, OF CHICAGO, ILLINOIS, ASSIGNOR TO THE UNION HORSE NAIL COMPANY, OF SAME PLACE.

HORSESHOE-NAIL MACHINE.

SPECIFICATION forming part of Letters Patent No. 665,857, dated January 15, 1901.

Application filed May 4, 1900. Serial No. 15,443. (No model.)

*To all whom it may concern:*

Be it known that I, BENJAMIN JUDD ABBOTT, a citizen of the United States, residing in Chicago, in the county of Cook and State of Illinois, have invented a new and useful Improvement in Horse-Nail Machines, of which the following is a specification.

This invention relates to improvements in the class of horse-nail machines of which the patent to me, No. 587,029, of July 27, 1897, is a type and is a modification of and in many respects an improvement upon my said patented machine.

My main object in the invention has been to render the machine very sensitive in the matter of stopping automatically when any one of the series of blanks being operated upon becomes unduly delayed in its course or becomes bent or distorted, so that it is arrested or stopped at any point. This increased sensitiveness is obtained by the peculiar construction fully detailed in description given below. The machine also embodies means for stopping the machine automatically when the end of a nail-rod is reached and before any fractional length or blank has been severed therefrom and allowed to pass into the machine. It also embodies numerous features of improvement which are set forth and described below and pointed out in the claims.

The machine shown in the drawings is adapted to work up two nail-rods simultaneously, there being duplicate clamping devices, duplicate feed-rolls, duplicate knives, duplicate positioning-tubes, duplicate reduction-rolls, and duplicate heading-dies, and most of such duplicate devices are independent of each other, although they may receive power from an actuating device common to both.

In describing the machine it will be understood that where the parts are duplicated like designating-numbers are applied to both, so that a description of one will, in fact, be a description of both In the accompanying drawings, Figure I is a front elevation of the machine, and Fig. II is a detail of a portion thereof. Fig. III is a side elevation. Figs. IV and V are sectional elevations on the lines A A and B B, respectively, of Fig. III. Fig. VI is an enlarged partial front elevation. Fig. VII is a section on the line D D of Fig. VI. Fig. VIII is a vertical section transverse of the rod-feed rolls and the severing devices and also of the stop-motion acting when the nail-rod is exhausted. Figs. IX and X are sections upon opposite sides of the line G G of Fig. VIII. Figs. XI and XII are sections on the lines H H and I I of Fig. VIII. Fig. XIII is an enlarged elevation of the tripping mechanism employed between adjacent pairs of reducing-rolls. Fig. XIV is a section on the line J J of Fig. XIII. Fig. XV is a detail vertical section, and Fig. XVI is a horizontal section, of a portion of the tripping mechanism. Fig. XVII is an enlarged front view, partly in section, of the mechanism for transferring the nails from the reducing-rolls to the heading mechanism. Figs. XVIII, XIX, and XX are sections on the lines M M, N N, and O O, respectively, of Fig. XVII. Fig. XXI to XXV, inclusive, are detail views of the ejecting-slides employed in the turn-plate and the ring controlling said slides. Fig. XXVI is a detail of the transfer mechanism. Fig. XXVII is a section of the mechanism for converting the continuous motion of the main parts of the machine to the intermittent motion needed for the heading mechanism. Fig. XXVIII is a detail of the brake for preventing overthrow by the intermittently-operated mechanism. Fig. XXIX is a horizontal section showing a plan of the same mechanism. Fig. XXX is a front elevation of the heading mechanism partly in section. Fig. XXXI is a side elevation of the same mechanism. Fig. XXXII is a sectional view of the drive-shaft, showing the drive-clutch in elevation. Fig. XXXIII is a section on the line P P of Fig. XXXI, and Fig. XXXIV is a section on the line Q Q of Fig. XXX. Fig. XXXV is an elevation of the toggle-operating cams. Figs. XXXVI and XXXVII are details showing the operation of the mechanism for locking the heading-dies while they are operating. Fig. XXXVIII is a detail, partly in section, of the ejectors for forcing the nails from out the heading-dies. Fig. XXXIX is a detail, partly in section, of the mechanism controlling the drive-clutch of the machine. Fig. XL shows the same and its connections to the machine. Fig. XLI is a vertical section of one of the nail-transfer passages between adjacent pairs of reduction-rolls. Figs. XLII, XLIII, XLIV, and XLV are sections on the lines T T, U U, V V, and W W of Fig. XLI. Figs. XLVI and XLVII are respectively a vertical section and a plan of a pair of opposing reduction-rolls. Fig. XLVIII is a plan of the heading-dies, and Figs. XLIX and L are sections on the lines X X and Y Y of Fig. XLVIII. Fig. LI is an enlarged section of the device actuating the ejectors of the turn-plate. Fig. LII is a detail section of the devices for cushioning the return strokes of the plunger operating the ejectors. Fig. LIII is a sectional view of one of the sprockets carrying the heading-die chain.

The nail-rod 2 is fed to the machine from a reel, (not shown,) which is located above the machine. After leaving the reel the rod first enters between spring-pressed blocks 3 3, held together by a set-screw 4 and spring 5. The tension of the spring may be regulated as desired, and the blocks act to take out the curl in the nail-rod imparted to it by the coiling. The blocks are suitably supported in a box or housing 6. The main function of these clamping-blocks is, however, the following: The feed-rolls draw the rod down the length of a blank and then let go of the rod, and, as will be understood, a reaction or recoil of the rod would then take place unless some means of prevention were employed, and I rely upon these clamping-blocks 3 3 to prevent this recoil or back movement.

Below the blocks 3 is a second clamping mechanism, which, however, is not brought into use except on occasions when clogging occurs in the passage between the knives and the first pair of reducing-rolls. This clamping mechanism consists of a straight-faced stationary jaw 7 and a movable jaw 8, the latter actuated by a toggle 9 9 thrown into action by a lever 10, having a weight 11 and a connecting-link 12, uniting the lever and toggle. A lever 13, pivoted stationarily, as indicated, sets under a pin 15 at the junction of the two parts of the toggle and normally holds the latter out of action; but when any clogging occurs the lever 13 is swung from under pin 15, so as to release the toggle and allow the weight to close the latter and force the movable jaw against the nail-rod, and thereby to stop any further feeding of the rod until the clogging or other disturbing cause is removed. The mechanism by which the clogging causes this action is shown at Figs. VI and VIII and is the following: At 16 is a shoe located at one side of the path of the freshly-severed blank and secured to the inner ends of two sliding rods 17 and 18. Normally there is room in the passage opposite the shoe for one blank 400, so that should another blank be severed and forced into the passage by the movable knife before the first one has gotten out of the way the shoe would be forced to yield to said second blank. The movement thus secured is carried by the rods to a vertical lever 19, pivoted stationarily at 20 and having a pivotal connection 21 to a head 22, carried by the rods. At its upper end this lever is pivoted to a horizontal connecting-rod 23, which is also pivoted to the lower end of said lever 13, so said lever is swung sufficiently to carry its upper end out from under pin 15. It will thus be seen that should any clogging occur at the part of the blank's path opposite the shoe 16 the clamps 7 and 8 will be thrown instantly into action and the feed of the nail-rod be stopped absolutely. To reset the clamp 8 and the actuating mechanism therefor, the weighted lever 10 may be raised and the connecting-rod 23 pushed back by hand. It is desirable to employ set-screws 170 and 180, bearing on rods 17 and 18, to prevent the too-easy operation of said rods by the freshly-severed blanks falling against the shoe 16.

I also provide in the path of the incoming nail-rod an automatic stop mechanism adapted to control the entire machine and intended to act when the end of the nail-rod has reached proximity to the feed-rolls. This mechanism consists of a horizontal bar 24, Fig. VIII, located just above the feed-rolls and having a vertical opening 25, through which the nail-rod moves, and a spring 26, mounted on the bar and pressing the same longitudinally against the nail-rod. The bar is supported with freedom to slide in bearings at 27 28, and the spring is confined between one of said bearings and a shoulder on the bar. Immediately below the bar is a stationary guide 29, surrounding the nail-rod and serving to support the latter against the thrust of the bar. With this construction it will be seen that when the nail-rod is so worked up that only a piece extending from the stop below the knives to the lower edge of bar 24 remains and such piece has moved entirely through the bar the latter will shift under the power of its spring, so as to carry it longitudinally from its normal position. In so doing the bar actuates a lever 30, pivoted between its ends on pivot 20, already mentioned, and by means of the arm 31, to which the lower end of the lever is attached, as shown at Figs. VI and VII, oscillates a vertical shaft 32, and through such shaft causes a stoppage of the entire machine, the shaft being connected by crank-arm 33 and a connecting-rod 34 to a controlling-plunger 35, passing through a housing 36, in which is located a spring-actuated latch 37, Fig. XXXIX. This latch normally engages a crank or arm 38 on rock-shaft 39 and prevents any movement of said shaft; but when shaft 32 is oscillated, as above stated, it withdraws plunger 35 and allows the latch to rise and free arm 38, so that shaft 39 may then be rocked by the power of a spring 40, Fig. III, attached to a stationary upright 41 at one end and to a clutch-lever 42 at its other end. Shaft 39 is also provided with a crank 43, to which said clutch-lever is joined as in Fig. XL, and consequently said clutch-lever, which is pivoted at 44, is so moved as to carry the clutching-head 45 away from its acting position, thereby destroying the power connection between the drive-pulley 46 and the shaft 47 from which the machine is actuated. It will thus be seen that the machine will be stopped automatically whenever any nail-rod has been cut so that only a predetermined length of it remains, thus warning the attendant, so that he can remove such end and start a fresh coil. By this means also I avoid any danger of the cutting of partial blanks, which would be very apt to lodge in the passage-ways and stop the machine.

When the operator desires to start the machine, he swings lever 48, pivoted at 49, to the position of Fig. XXXIX, and thereby, through the connecting-rod 50 and the arm 51 on shaft 39, moves the clutch-lever, so that the clutch is shifted to its acting position and causes the transmission of power from pulley 46 to shaft 47. When he has done this, latch 37 falls under the pressure of its spring and engages arm 38 and locks shaft 39, and such lock is retained, so that the machine is continued under its driving power by oscillating shaft 32 by means of a hand-lever 52, such oscillation carrying the plunger 35 into locking position with the latch, as seen at Fig. XXXIX. When the operator wishes to stop the machine, he takes hold of lever 52 and oscillates shaft 32 and withdraws plunger 35 from the latch, and the action is then the same as with the automatic stoppage above set forth, the spring 40 furnishing the power for the remainder of the operation.

Below the stop-bar 24 are the feed-rolls 53 53, located at opposite sides of the nail-rod and having their faces relieved, except at such parts 54 as are needed to effect the intermittent feed of the rod. The cut-away parts are sufficiently deep to avoid all contact with the rod, so that the latter receives no pulling friction from such parts. Below the rolls is a guide-block 55, located over and extending down to the knives and having a vertical opening, as seen at Fig. 8, through which the nail-rod passes, and which fits the same as nearly as may be without creating unnecessary friction thereon.

One of the knives 57 is stationary, but is adjustable toward the point of cutting by a screw 58. It passes through a yoke 59 and is clamped therein by a screw 60 and a filling-piece. The movable knife is shown at 61 and is carried in a slide 62, being fitted into a recess 63, formed in the slide, and is confined and held in the recess by a clamping-piece 64 and a screw 65, located at the front of the recess. To position the knife with its cutting edge at the proper vertical plane, I employ a follower 66 and a filling piece or pieces 67, Figs. VII and VIII. The knife-slide 62 is operated by two cams 69, both on shaft 68, and at opposite sides thereof and working against rollers 70, carried by the slide at opposite ends of a recess 71, formed to receive the cams. The slide 62 moves between ways 72, which are preferably in one piece, and is confined therein by a plate 73, and a gib 74 may be employed with the slide to take up the wear. The shaft 68 has an adjustable side 75 in its bearing adjacent to the cams, the position of which is regulated by a wedge 76, adjusted by the screw 77, and the adjustable side is locked in its adjusted position by the screw 78.

The movable knife 61 is given a period of rest immediately on the completion of the severation of the blank, so that during such period it so contracts the passage-way between it and the shoe 16 as to prevent the blank from losing its vertical position and controls it in this manner until it has moved downward beyond the face of the knife. This period of rest is due to the construction of the cams, which, in fact, also allow to the knife a dwell at the end of its retracting stroke during which the nail-rod is fed down.

The guide-block 55 has a downward extension 79, through which an opening is made for the movable knife and also serves as part of the casing of the tube which turns the blank in positioning it for the action of the first set of reduction-rolls, presently to be described. It also supports a stop 80 below the movable knife and whose function it is to arrest the nail-rod when the feed-rolls feed it down, thus insuring the feeding of only the required length of the rod to form a blank. This stop can be changed in height whenever required by any change in the size of the nails manufactured.

The nail-rod is fed to the knives with its broad sides parallel to the acting faces of the latter; but the blanks are given a quarter-turn before they reach the first pair of reduction-rolls by the spiral passage-way formed in the half-tubes 85, let into casings 88, supported in part by the depending extension 79 and in part by the holder 86, which serves as a support for the stationary knife. The tube is made in removable halves like the tubes located between the reduction-rolls, and more particularly described hereinafter, so that different-sized tubes may be substituted when working on different-sized nails and to permit cleaning, &c. Its casing is held against vertical movement by the interlocking recess and projection shown at 87 and is confined in place by a spring-latch 89, pivoted at 90 and readily movable into and out of engagement with the tube.

After leaving the knives the blank is operated upon successively by eight pairs of reduction-rolls, 95 95 being the first pair and the others being numbered in succession from 97 to 103, inclusive. The first, third, fifth, and seventh pairs of rolls all act on the edges of the blank, and the second, fourth, sixth, and eighth pairs all act on the broad or side faces of the blank, and consequently the blank is given a quarter-turn while moving from each pair of rolls to the next succeeding pair. This turning of the blank is accomplished by spiral passage-ways located between the several pairs of rolls and formed in half-tubes 96 96, (best shown at Figs. XLI to XLV,) and much resembling the half-tubes 85, already mentioned. The tubes are each let into casings or holders 104 and are removably secured therein by screws 105. These tubes can, with this construction, be readily changed whenever a change is to be made in the size of the nail being made or they need replacing or cleaning.

A portion of each passage-way between the different pairs of rolls is formed by yielding heads connected to the driving-clutch of the machine and adapted to be tripped by any blank which is so deformed as to cause unusual pressure upon the walls of the passage. My preferred construction of this yielding head is illustrated at Figs. I, XIII, XIV, XLI, XLII, and XLIII. The head 110 is mounted on a swinging arm 111, pivoted at 112 and retained normally in position by a rod 113, attached at one end to said arm and sliding at its other end in the swiveled bearing 114, and also having a projection 115 engaging a trigger 116, pivoted at 117 and setting against a shoulder on the spring-plunger (shown at 118) and operated by the spring 119. When unusual pressure is put upon the yielding head, it swings in the direction the nail is moving, and thereby forces the trigger to release the plunger, and the latter is so connected to the vertical oscillating stop-shaft 32 as to cause the instant stopping of the machine. These connections consist of an incline 120 on the side of the plunger, a sliding yoke 121, having a roller 122, bearing on the incline, and the crank-arm 123 on shaft 32, Fig. XVI. That portion of the connection between the yoke and the crank-arm is supported in the bracket 109 and is adjustable in length by means of the nuts 106, 107, and 108 and the threads upon which they work, so as to permit the fine adjustments necessary. The heads 110 are formed with grooves 124 and set against the upper portions of the tube-casings 104, the passage-ways for the blanks being thus formed partly in the heads, and the heads are also dovetailed to their carrying-arms, so they can be also changed whenever required, as seen at Figs. XLI, XLII, and XLIII.

In the construction thus detailed it will be noticed that only a very slight movement of the yielding head is necessary to trip the machine. I have heretofore planned the mechanism so that a yield by the yielding head of one sixty-fourth of an inch will produce this result. It will also be noticed that the yielding head merely sets in operation the mechanism for tripping the machine instead of effecting such tripping by its own action or power, and that a motor 119, which may be and preferably is a spring, is provided for operating the tripping mechanism. In both these respects the mechanism differs from previous constructions, and it is to them that the great sensitiveness and quick action of the mechanism whereby I obviate all danger of damage to the machine through clogging or distorted blanks is largely due. This tripping mechanism just described is duplicated between all of the adjacent pairs of reducing-rolls, and consequently the description already given covers them all. The spring-plungers are supported at their rear ends in bearings 125 and at their outer ends in the housings 126, in which are located the swiveled bearings 114. At their outer ends both the plungers and the rods 113 are provided with buttons 127 and 128, whereby they may be conveniently pushed back to their normal positions by hand. The triggers 116 are pivoted in brackets 129, bolted to the housings 126. In Fig. XIII one of the tripping mechanisms is shown in its normal position and the other as having been operated to effect a stop of the machine.

The reduction-rolls revolve in half-boxes 130, Fig. XIV, which are adjustable by means of wedges 131, regulated by screws 132, and locked by screws 133. The housings 104 of the quartering or positioning tubes 96 are assembled as shown at Figs. XLIII and XLIV, and a strap 134 is also passed around them, and a wedging-key 135 is inserted in openings in the ends of the strap, so as to hold them together. The back one of the housings 104 is provided with integral lugs or forward projections 136, bolted to the frame by bolts 138, and the other housings are provided with shoulders 137, at their sides resting on said projections 136, so that all the housings are firmly supported in vertical directions, and the housings are all clamped together by the keys 135.

From the last pair of reduction-rolls the blank passes head first into radially-disposed recesses or sockets in a rotatable turn-plate 140, acting to carry the blank from a vertical position to a horizontal one and to deliver it point first to the heading-dies. In its movement from the reduction-rolls to the turn-plate no turning movement is imparted to the blank, and it passes first through a straight tube or passage-way 141, formed in part by a yielding head 110, similar in all respects and connected to tripping mechanism in the same way as those already described, so that the same tripping action above set forth will take place if a distorted or deformed nail reaches said passage 141.

Below passage 141 is a continuation thereof (shown at 142) extending to the turn-plate, one side of which continuation is formed by a door 143, swinging on a hinge 144 at its top and adapted to yield to the blank in case the latter does not enter the turn-plate socket to the proper extent, or, in other words, so that its point will not clear the passage 142 when the turn-plate revolves. A lever 145 lies across or in front of the door 143 and its companion door and is deflected by either door when the latter is opened by a blank lodging in position to be brought against the door by the turning of the plate. The lever is pivoted at 146 and joined to an adjustable rod 147, connecting it to the crank-arm 148 on rock-shaft 32. The shaft 32 is permitted only a limited movement, and as such limited movement, although sufficient to effect the tripping of the machine, may not be sufficient to allow the extent of movement required by the momentum imparted to the turn-plate, and to avoid any straining or damage to the lever or the connecting-rod when the turn-plate moves farther than is necessary for the tripping operation I make said lever in two parts, 145 and 149, both pivoted on 146, and with the latter normally locked to the former by a spring-pressed pin 150, adapted to yield and destroy the lock when the power put on the lever is unusual. This permits the doors to be opened to any extent required in removing the offending nail, as well as permitting the opening necessary to accommodate the momentum. A retracting-spring 151 is also applied to the part 149 of the lever.

The turn-plate is shown at Figs. XVII, XIX, XX, XXIX, and LI. It is provided with a series of radial sockets 152, each admitting one of the rolled blanks and each pair thereof communicating with each other for the major portion of their length, so as to permit the use of the double ejecting-slides 153. (Shown in detail at Figs. XXI to XXIII.) The nails enter the sockets and rest against the ends 154 of the slide, and when the turn-plate has moved far enough to bring the nails to a horizontal position this slide is actuated in a direction which will cause the ejection of the blanks from the turn-plate and into the heading-dies, a full description of which will be given later on. The means for giving this movement to the slide are the cam 156 on the main shaft 157, the slide-bar 158, carrying a roller 159, working on the cam, and an oscillating lever 161, fulcrumed on the pivot 162, supported by the box 163, adjustable in the lever 161 and connected at its lower end to a bar 164, forming part of the push-out plunger or bar hereinafter described and whereby the slide is actuated in ejecting the nails. The slide-bar 158 carries an arm 165, in which is a pivot 166, carrying a roller moving in a cam-groove on the side face of cam 156, and thereby the cam compels the bar 158 to move back after it has been actuated by the face of the cam.

The purpose in making box 163 adjustable is in order that the stroke of lever 161 may be varied when adjusting the machine for different lengths of nails, the adjustment of the box changing the position of the fulcrum, and thereby varying the length of the stroke imparted by the lever to the ejecting-bar 164.

This adjustment of the fulcrum-box is attained by the following construction: The lever 161 is slotted, as shown at 167, Fig. XIX, and a bolt 168 is employed to tighten the surrounding parts of the lever upon the box. By loosening this bolt the box is released, so that it may be adjusted. The fulcrum is solid, with a forked stand 169, which has elongated bolt-holes 171, through which bolts 172 are passed up into a stationary part of the machine, which I call the "bed" and which is shown at 173. Upon loosening bolt 172, as well as bolt 168, the forked stand may be moved either forward or back by an adjusting-screw 174, having a threaded engagement at one end with the stand and held stationary at the other end by a suitable bearing attached to the bed. This latter feature is not shown, but the construction of it will be readily understood. The lower end of lever 161 is provided with a pin 175, working in an elongated slot 176 in the ejecting-bar 164.

The ejecting-plunger, of which the bar 164 is a part, is best shown at Figs. XIX, LI, and LII. One end of said bar is entered within the bore of an exteriorly-square tube 177, having its end at which the bar is entered split, as seen at 178, and this split end is compressed by a collar 179, tapered interiorly and fitted on the tapered end of the tube, so as to cause it to grip the bar 164 with sufficient firmness to insure the sliding of the tube by the bar under ordinary circumstances; but if any unusual resistance is encountered by the tube, which is positively connected to the ejecting-slide 153, as hereinafter stated, such as would be caused by the presence in the heading-die of a blank not discharged at the proper time or the inability of the nail to enter the die by reason of some deformity imparted to it by the reducing-rolls, such resistance overcomes the grip upon bar 164 and allows it to telescope into tube 177, where it encounters a cushioning coil-spring 180, filling the whole length of the tube. I thus avoid any danger of breakage and bring the tube 177 to a gradual stop. When this unusual resistance occurs, it also stops the machine by the following means: Attached to sliding tube 177 is a cam-arm 181, projecting into proximity to the connection between lever 161 and bar 164. This cam-arm passes through a latch 182, carried in bar 164, and such latch is forced outwardly whenever tube 177 does not move with bar 164. In the position to which it is thus forced said latch engages a tappet-arm 183, secured to a connecting-rod 184, supported at one end by a crank-arm 185 on shaft 186 and at the other end by devices presently to be set forth. The engagement mentioned causes a longitudinal movement of rod 184 and oscillates shaft 186 and through another crank 187, connected to an adjustable connection 188, and an arm 189 actuates a slide 190, and said slide through the adjustable connection 191 is joined to a crank-arm 192, mounted upon and actuating shaft 32 and through the latter effects the stoppage of the machine.

The ejecting-plunger is made to engage the slides 153 in the turn-plate in succession by providing the slides with blocks 193, having dovetail recesses which are engaged by the dovetail tongue 194, carried by the plunger-tube 177. The rotation of the turn-plate carries these dovetail recesses and tongue into and out of engagement, the engagement taking place when the slides reach the horizontal position and terminating when the turn-plate moves to bring the next following slide into position. The various slides are kept in their normal positions by a stationary ring 195, located at the side of the turn-plate and having an opening at one side registering with the slides when in proper position for the ejectment of the nail, the ring thus retaining control of all the slides except the one by which the nail is being ejected.

It will be understood from the description already given that the slides are returned to their normal positions in the turn-plate by the retraction of the plunger under the power of cam 156, and in order to prevent any hammering by the slides upon the center-piece 196 when they return I provide means for cushioning the return stroke of the plunger as follows: The end of bar 164 opposite to that connected to the plunger-tube is extended into a stationary casing 197, supported by a bracket 198, Figs. XIX and LII, in which is a cushioning-spring 199, held in the casing by the nut 200. The rod passes through a guide-bracket 201 and at its end within the casing is provided with a head 202, fitting the interior of the casing.

After any telescoping of the plunger-bar 164 and tube 177 such as has been described the resetting of the bar and tube in relative normal positions will ordinarily take place without aid from the attendant by the contact of the slide with the center-piece 196 during the retraction of bar 164 under the power of cam 156. The plunger-tube 177 is supported in ways formed in the bracket 203. The center-pin 196 is removable from the turn-plate with the retaining-ring and when removed affords opportunity to remove the ejecting-slides from the turn-plate.

As already stated, the blanks when they reach the horizontal position are ejected from the turn-plate and into the heading-dies. These dies are shown in detail at Figs. XLVIII, XLIX, and L and made in two parts 210 and 211. The recess for the head is formed mainly in the part 210, as plainly shown, and each part is recessed to operate upon two blanks, as also shown. The dies are inserted in sockets formed in the links 212 of an endless chain supported upon sprocket-wheels 213 and 214 and preferably are somewhat loose in their sockets, so as to admit the nails easily and also so as to facilitate the discharge of the nails after the dies have operated. This looseness is shown in Fig. L, and the dies are secured at their ends by means which permit them the necessary movement toward and from each other. I have adopted as suitable means a dovetail 215, setting over one end of the dies at one end of the socket, and set-screws 216 at the other end of the socket, entering elongated slots 217 in the end of the dies. Of course the screws 216 must not bear against the dies, but simply act to confine them in the socket without interfering with their free movement.

Both the turn-plate and the endless chain of dies are operated intermittently and simultaneously by a cam 220 on shaft 157. This cam through the roller 221 moves a yoke 222 in one direction and brings it back by means of a roller 223, traversing the cam-groove 224 in the side face of the cam, the roller being carried by an arm 225, attached to or integral with the yoke. The yoke carries a latch 226, which when the yoke is operated by the cam and roller engages the ratchet-wheel 227 on shaft 228, and thus gives the latter an intermittent rotation, Fig. XXVII. Shaft 228 carries the sprocket 213, already mentioned, and to said sprocket is bolted a gear 229, which meshes with an intermediate 230 and through the latter drives another gear 231, fastened to the turn-plate. The intermittent movement thus given to shaft 228 is communicated to the chain of heading-dies, and through the connections described a simultaneous movement is also given to the turn-plate, so that at each impulse of said shaft the turn-plate is caused to present nail-blanks at the ejecting position, and heading-dies are also presented in position to receive said blanks. In the same movement the turn-plate also presents its radial sockets in position to receive fresh blanks from the reduction-rolls, while the chain of dies presents a pair of its dies, with contained blanks, in position for the heading-punches to form the heads (an operation which will be set forth in a subsequent part of this application) and also presents another pair of blanks in position for the operation thereon of the discharging-plungers, also to be described later. A spring 232 is placed around the stem of yoke 222 and takes up any lost motion and gives it a steadier movement than it would otherwise have.

It is desirable to prevent any overthrow or excess movement by the turn-plate and heading-dies, and I have adopted several safeguards to prevent it, as will be seen from the following parts of this specification. The first of these is a stop-pawl 240, fast on yoke 222 and engaging a ratchet 241 on shaft 228 and having the face of its teeth reversed from those of ratchet 227, so that it is adapted to be engaged by pawl 240 at the end of the cam stroke, and thereby prevent any overthrow of shaft 228 or the parts carried or operated by it. Another of the overthrow-preventing devices consists of a friction-drum 242 on shaft 228 and a shoe 243, bearing on the drum with a pressure regulated by the spring 244 and set-screw 245. The shoe is held in place by the bolt 246. Another overthrow-preventing device is found in what I call the "index" mechanism, consisting of an index or toothed wheel 250, mounted on shaft 228 and having its teeth 251 made high at front and low at the rear, with a gradual slope from the high to the low side, and an index-latch 252, engaging such index-wheel and moved to engage and disengage the same by a lever 253, pivoted to a stationary support 254 at one end and operated at its other end by a grooved cam 255, bolted to the fly-wheel 256 on shaft 257. The point of the latch is beveled in opposite directions, as plainly shown at Fig. XXVII, so that with the aid of the sloping sides of the teeth it centers the wheel accurately, even if the latter does overthrow to some extent, as it would also do if by any chance the index-wheel should fall short of its full movement. A spring 258 on latch 252 exerts its power downward and takes all lost motion in the lever and cam and renders the movement of the latch steady and noiseless. A housing 259 surrounds the latch and spring and is bolted to the bed-plate. The sloping of the teeth of the index-wheel allows the latch to move down in front of the next tooth before the time arrives at which a lock should be effected, so that said next tooth must of necessity engage the latch instead of passing it.

In addition to the above I also employ means for correcting any improper positioning of the turn-plate, consisting of an index finger or lever 260, supported centrally upon a stationary pivot 261 and adapted to enter its upper end, which is tapered on opposite sides, within the open sides of the radial sockets in the plate. It is actuated to do this by a cam-bar 262, attached to the nail-ejecting plunger 177, and is supposed to center the turn-plate by the time the nails are ready to enter the heading-dies.

When the nails are entered in the heading-dies, their points enter the annular spaces 270 in the sprocket-wheel 213, and I prefer to employ in conjunction with said wheel friction devices, which will act on the nails and retain them in position after they have been once entered. These friction devices are very cheaply and easily made by employing inverted-U-shaped springs 271 and positioning them on the crown of the partition 272, separating said annular spaces. Each limb of these springs forces one of the nails against the outer wall of the annular space in which it is located, and thereby effects the purpose aforesaid. I employ this friction device only in the case of sprocket 213, as there seems to be no occasion for its use after the heading operation, although the sprocket 214 has the same annular spaces 270.

When the nails have been carried up by the dies in their step-by-step movement to a central position between the sprocket-wheels, I lock up two consecutive sets of the heading-dies in the following manner: A combined positioning and abutment block 280 is inserted between the two sets of dies, and then both sets of dies are forced together or closed by pressure applied to the outer half of each pair, and while thus held the forming or head-finishing dies operate upon the blanks and complete the formation of the heads. The abutment-block is actuated as follows: On shaft 257 is an eccentric 281, attached to which is a pitman 282, connected to and operating a sliding frame 283. In the lower cross member of this frame are recesses or slots in which are placed forming-dies 284 and the abutment-block 280. The latter receives its motion from the frame, but is yieldingly held therein, a spring 285 being interposed between the block and the frame. The block has a slot extending through it from front to rear, through which is passed a retaining-key 286, whose office it is to hold the block in the frame and also to limit its movement. The key is held in position by the pin 287 passing through it and also through lugs 288 at either side. When the parts move down from the non-operative position shown by broken lines in Fig. XXXVI to the position shown in full lines in the same figure, the block enters between the two pairs of chain-dies and rests upon the top of the chain-links and the spring 285 permits such further downward movement of the frame 283 as may be required to enable the forming-dies to perform their work. Horizontal pressure is now applied to the chain-dies, forcing both pairs toward the abutment-block by means of toggles, one member 289 of each of which is short as compared with the other member 290 and is pivoted to a stationary block 291, let into a recess in the frame of this part of the machine. The blocks 291 are adjustable in their recesses by movable wedges 292, having upstanding lugs through which are passed adjusting-screws 293. Locking-screws 294 serve to hold the blocks in their adjusted positions.

The long members of the toggles are shaped as shown, so that their points may enter between the chain-dies and rest upon the chain-links, as seen at said figure, and when they have thus entered between the dies power to straighten the toggles is applied to the members 290, as follows: On shaft 257 are two cams 295 295, Figs. XXXI and XXXIV, each of which operates a lever 296, each on one of the shafts 297, carrying cranks 298. These cranks depress and lift connecting-rods 299, pivotally joined to the members 290 and to the cranks 298, and thereby serve to straighten the toggles and cause the pressure upon the chain-dies necessary to bring each pair of them in close contact and also to lock them very firmly in this closed condition during the ensuing operation of the forming-dies. The cams 295 operate levers 296 in both directions, having rollers 300 bearing on the faces of the cams and side rollers 301 working in the cam-grooves 302 on the sides of the cams.

Inasmuch as the power mechanism just described is not adapted to cause the entrance of the toggle-points between the dies nor to lift them therefrom, I employ positioning mechanism in connection therewith to perform that office, and the preferred construction thereof is that now to be detailed. Joined to the inner end of toggle member 290 is a connecting-rod 303, which in turn is jointed to a collar 304, rigidly secured upon sliding rod 305, preferably by means of a shoulder 306 on the rod and a nut 307 threaded thereon and setting up against the collar. The rod is passed through a bearing 308, threaded in an opening in the part 309 of the frame, and locked in position by jam-nut 310. Between the bearing 308 and jam-nut 311 at the top of the rod is a lifting-spring 312. A stationary bearing for the lower end of the rod 305 is also shown at 313. The positioning devices act as follows: When the connecting-rod 299 descends, it causes the point of toggle member 290 to descend quickly because of the resistance by the lifting-spring to any downward movement at the end to which the spring is attached, and after the point is seated between the heading-dies any further downward movement of rod 299 merely compresses the lifting-spring and the toggle member swings on said rod, and when the rod 299 ascends it also causes a quick rise of the toggle-member point from between the dies because contact then takes place between collar 304 and the lower end of bearing 308, and thus limits the extent of the upward movement of the inner end of the toggle member and compels the latter to swing on the rod 299. The bearing 308 is adjustable for the purpose of hastening or delaying the positioning of the toggle member or to regulate the extent of the throw imparted to the toggle member. As shown at Fig. XXXV, the actuating-cams are in the position occupied by them at the start of the downward movement of rods 299. As these rods sometimes need to be adjusted to regulate the pressure caused by them, I make them in parts, the upper part 314 being united to the lower or main part by a right and left handed screw 315, having an enlargement 316, adapted to be operated by a wrench. The threaded sockets at the adjacent ends of the parts 299 and 314 are split and adapted to be tightened on the screw 315 by clamping-bolts 317 and 318.

In order to bring the forming-dies 284 into accurate register with the heading-dies, I preferably provide adjusting tapered gibs 319 at the sides of frame 283, whereby I am enabled to adjust the dies in either horizontal direction as needed. The vertical pressure of the dies is regulated by gibs 320 in frame 283, and by said gibs and frame the dies are actuated in the performance of their office. Bolts 321 regulate gibs 319, and bolts 322 regulate gibs 320. The shaft 257 is enlarged at the end carrying the eccentric 281, and this enlarged portion 329 is supported in the frame 328 and provided with an upper brass bearing 323, which is called upon to sustain the back thrust of the forming-dies, and to take any wear caused at this bearing I provide the adjusting-wedge 324, held in position by screw 325 and locked by screw 326. A tie-rod 327 extending from an outwardly-projecting arm cast on the part 328 of the frame to an outwardly-extending arm cast on the part 330 of the frame, is employed to firmly hold these parts against the separating tendency caused by the heading operations. Although these parts of the frame are bolted firmly together in a plane back of the plane of the heading devices, yet some means of uniting them in front of the plane of the heading devices has been found essential, and hence I have adopted the tie-rod shown. As will be understood from the drawings, it possesses very great strength. A similar tie-rod 331 is let into side projections 332, cast on the frame member 328, to assist in resisting the thrust of toggles when they lock up the dies.

The nails remain in the die-chain until they have been carried around wheel 214 and to a position over the discharge-opening 340 in the frame member 330. When they reach this point, they are ejected downward from the heading-dies by the following mechanism: At 341 on the end of shaft 257 is a wrist-plate actuating a connecting-bar 342 and a sliding rod 343, joined to the lower end of the bar and moving in bearings provided in the part 330 of the frame. Borne upon this sliding rod is a laterally-projecting arm 344, carrying two spring plungers and their housing 345. The plungers are shown in detail at Fig. XXXVIII, and consist of the plungers proper 346 and downwardly-acting springs 347, encircling their stems. The acting faces of the plungers are preferably recessed with conical recesses 348. Each pair of dies is moved into position under these descending plungers and present the point ends of the nails to them, so that as the plungers move down they will force the nails with them. When the plunger encounters the nail, its spring allows it to yield to the nail until the plunger encounters the shoulder 349 of the housing. The downward force on the nail then becomes positive and starts it on its discharge, and the spring acts to give it an additional impetus, so as to make sure of its being carried entirely below the path of the chain and heading dies before the latter again move. In case of any failure to discharge the nail at the proper time and point the machine is stopped as follows: At 350 and 351 are arms or contacts projecting from a vertical rock-shaft 352, one just above and the other just below the die-chain, and adapted to be engaged by any nail remaining in the dies. If the nail projects above the dies, it will strike one of said arms, and if it projects below the dies it will strike the other arm. The engagement between the nail and either of said arms will rock said shaft and by means of a crank-arm 353 impart a longitudinal movement to the rod 184, already mentioned and connected to the shaft 32. A guard 354 is placed around the die-chain and fastened at the top to one of the arms 332 and at the bottom to the part 330 of the frame and acts to prevent any of the nails from falling partly out of the dies or into any position in which they would be likely to be caught against the outside of the part 330 of the frame containing the discharge-opening before reaching the opening. The part 330 supports the chain against the thrust of the discharging devices and also prevents any sagging of the under course of the chain.

A hand-wheel 360 is applied to the shaft of sprocket 214 for convenience in operating the chain when it is desired to bring any particular die to a point where it can be gotten at for removal or any other purpose. In order to thus operate the chain, the shaft 257 is turned until the latch 252 is lifted above the teeth of the index-wheel 250 and kept in that position, and then the hand-wheel can be freely operated in one direction. The turn-plate can also be turned to any desired position through this same hand-wheel as it moves with the chain.

A plate 361 is bolted to the housing or frame 126 to confine the swivel-boxes 114 in place. The pivot 261 of the index-finger 260 is supported in a bracket 362, bolted to the part 332 of the frame. A guard 363 is placed around the face of the turn-plate, as shown in Fig. XVII, designed to prevent the nails from jumping out of the turn-plate sockets and catching on the heading-dies when the plate is rotated, there being some liability to this change of position by the nail owing to the quick intermittent movements of the plate. A fly-wheel 364 is shown on shaft 157, and the rim of this wheel is preferably provided with openings 365 at intervals, so it will receive a bar or lever whereby the shaft may be turned by hand as occasion requires. The balance-wheel 256 is also preferably provided with openings similar to those in wheel 364 and for the same purpose. So, also, on shaft 68 is a balance-wheel 367, having similar rim-openings 368.

The machine is driven by power from the belt-pulley 46 on shaft 47. Said pulley is loose on the shaft and runs continuously and is enabled to operate the shaft by a clutch mechanism, the shifting head of which is shown at 45. Shaft 47 carries a pinion 370, which meshes with a gear 371 on shaft 372, carrying a gear 373, meshing with the first of a train of similar-sized gears 374, 375, 376, 377, and 378. Upon the same shaft with gear 377 at the opposite side of the frame is a gear 379, meshing with a pinion 380, making two revolutions to one of gear 379 and actuating shaft 68, whereby the movable knife is operated, as already explained. Pinion 370 also drives a gear 381 on shaft 382, carrying a gear 383, and the gear 383 drives a train of gears 384, 385, 386, and 387. Of the gears above mentioned those numbered 374, 375, 376, 377, 384, 385, 386, and 387 are on the shafts of one of each pair of reducing-rolls and the gear 378 is on the shaft of one of the feed-rolls. The driven one of each pair of reduction-rolls drives its mate through pinions 388, and the driven feed-roll actuates its mate roll through pinion 389. Meshing with gear 381 is an intermediate gear 390, driving the gear 391 on shaft 257, which operates the heading mechanism. Said gear 381 also actuates an intermediate 392, which meshes with a gear 393 on shaft 157, operating the chain of heading-dies and the turn-plate. The driving mechanism mentioned in this paragraph is shown in Figs. III, IV, and V.

In the preferred construction I provide four standards or uprights 401, 402, 403, and 404 for the support of the feed-rolls, the knives, the reduction-rolls, and the actuating mechanism therefor. The shafts of driving-gears 374 to 378, inclusive, and 384 to 387, inclusive, are all made in two parts, one carrying the gear and the other roll, and are coupled together by couplings 405, this feature being used to enable the making of adjustments which would otherwise be very difficult or impossible.

The yoke 222 is provided with an elongated opening 420, through which shaft 228 passes, and said shaft is made to serve as a means for supporting the yoke by surrounding it with a bushing 421, which bears against the upper and lower surfaces of the opening and is preferably flattened on top, where the pressure of the yoke is felt.

In nail-machines made previous to my invention the reducing-rolls make from a complete revolution to a revolution and a half after the starting in operation of the stop-motions. This slowness in stopping is a frequent cause of trouble and breakage and has been due very largely to the nature of the drive-clutches employed and also, though in a less degree, to the sluggishness of the stop-motion mechanism. The latter I have remedied by simplifying the mechanism as much as possible and by employing a strong motor-spring 119 wherever possible with each stop-motion, in which springs power may be stored sufficient to operate the mechanism, and instead of the drive-clutches heretofore used and which are generally of the kind known to the trade as "Hill" clutches and require a large exertion of power to unship, I employ an easily and very quickly operated clutch, consisting of two half-rims 410 410, each attached at one end to one of the arms 411 411, radiating from hub 412, fast on drive-shaft 47, a rim 413, rigidly attached to the side of drive-pulley 46 and against which the half-rims are forced, and arms 414 414, carrying adjustable screws 415 at their inner ends riding on the shifting head 45, said arms being pivoted at their outer ends to the arms 411, as shown at 417, and having projections 418 entering between the half-rims. The half-rims are faced on their operating-faces with hard-wood blocks 416, and the shifting of the head 45, which is conical on its exterior, expands or contracts the inner ends of the arms 414 in such manner as to cause the projections 418 to either tighten or loosen the half-rims with respect to rim 413. With this construction of clutch, which is very easily and quickly operated and very much more so than are the clutches heretofore employed, I am able to bring the machine to a full stop in from a sixteenth to an eighth turn of the reducing-rolls, and obviously thereby I not only reduce the danger to the machine caused by clogging and obstructions in the nail-passages, &c., to a minimum, but practically take away that source of danger, as the machine can hardly work any damage to itself from such causes in the short time required for the stoppage. The quickness of the stop-motions is very important in another aspect. It enables me to operate the machine with safety at a speed exceeding that of previous machines by about one-half.

I claim—

1. The horse-nail machine having a stop-motion mechanism consisting of a yielding device in the nail-passage operated by deformed or misplaced nails, a spring-motor controlled by a latch releasable by said yielding device, a sensitive and easily-released expanding-rim clutch whereby power is communicated to the machine, and mechanism whereby the power of said motor is caused to release the clutch, substantially as specified.

2. The combination with the stop-motion mechanism of a device adapted to be moved from its normal position by an offending blank or nail, a motor-spring connected to the stop-motion mechanism, and a latch controlling said spring and released by said device, substantially as specified.

3. In a horse-nail machine, a sensitive and quick-acting clutch whereby power is given the machine, in combination with a pivoted yielding device arranged in the path of the nail-blank and swinging in the direction the blank moves, and adapted to yield downwardly to unusual pressure from the blank, and mechanism set in operation by said yielding device and acting to release said clutch, substantially as specified.

4. The horse-nail machine having a sensitive and quick-acting clutch whereby power is communicated to the machine, in combination with a device located in the path of the nail-blank and adapted to yield to unusual pressure by the blank, a trigger released by the movement of said device, a spring in which power is normally stored and which is controlled by said trigger, and mechanical connections operated by said spring and carrying power therefrom to the controller of the clutch, substantially as specified.

5. The horse-nail machine having a sensitive and quick-acting clutch whereby power is communicated to the machine, in combination with a yielding device located in the path of the nail-blank and adapted to yield in the direction of the blank's movement to unusual pressure by the blank, a trigger released by the movement of said device, a spring in which power is normally stored and which is controlled by said trigger, and mechanical connections operated by said spring and carrying power therefrom to the controller of the clutch, substantially as specified.

6. The horse-nail machine having a sensitive and quick-acting clutch whereby power is communicated to the machine, in combination with a swinging device located in the path of the nail-blank and adapted to yield to unusual pressure by the blank, a trigger released by the movement of said device, a spring in which power is normally stored and which is controlled by said trigger, and mechanical connections operated by said spring and carrying power therefrom to the controller of the clutch, substantially as specified.

7. The horse-nail machine having a sensitive and quick-acting clutch whereby power is communicated to the machine, in combination with a swinging device located in the path of the nail-blank and adapted to yield in the direction of the blank's movement to unusual pressure by the blank, a trigger released by the movement of said device, a spring in which power is normally stored and which is controlled by said trigger, and mechanical connections operated by said spring and carrying power therefrom to the controller of the clutch, substantially as specified.

8. The combination with a series of yielding devices arranged in the path of the nail-blank and yielding to any unusual pressure therefrom, of a shaft 32, by the oscillation of which the machine may be stopped, a series of motor-springs corresponding to said yielding devices and each adapted to independently cause the oscillation of said shaft, and latches releasable by the respective yielding devices and each controlling one of said springs, substantially as specified.

9. The combination with a yielding device arranged in the path of the nail-blank and yielding to any unusual pressure therefrom, of shaft 32 through the oscillation of which the machine may be stopped, a motor-spring, a latch controlling said spring and itself controlled by said yielding device, and connections whereby said spring causes the operation of said shaft, substantially as specified.

10. The horse-nail machine having an oscillating shaft 32 and a series of stop-motions each having its own motor-spring for operating said shaft, and a latch controlling the spring, in combination with the driving-clutch of the machine, and mechanism consisting of a crank arm and rod connecting said shaft to the controlling mechanism of the clutch, substantially as specified.

11. The horse-nail machine having an oscillating shaft 32 and a series of stop-motions each having its own motor-spring for operating said shaft, and a latch controlling the spring, in combination with the driving-clutch of the machine, which is provided with a releasing-spring and a latch controlling such spring, a plunger for holding said latch in action, and mechanism consisting of a crank arm and rod connecting said shaft to said plunger, substantially as specified.

12. The horse-nail machine having an expanding-rim friction-clutch connecting it to the source of power, and a spring for releasing the clutch, in combination with the oscillating shaft, the series of springs each adapted to independently operate said shaft, and the devices whereby said shaft releases the clutch-spring, substantially as specified.

13. The horse-nail machine having an expanding-rim friction-clutch connecting it to the source of power, and a spring for releasing the clutch, in combination with the oscillating shaft, the series of springs each adapted to independently operate said shaft, means whereby said shaft-operating springs may be released by the nail-blanks, and the devices whereby said shaft releases the clutch-spring, substantially as specified.

14. The horse-nail machine having an expanding-rim friction-clutch connecting it to the source of power, and a spring for releasing the clutch, in combination with the oscillating shaft, the series of springs each adapted to independently operate said shaft, and the plunger 35 operated by said shaft and causing the release of the clutch-spring, substantially as specified.

15. The horse-nail machine having an expanding-rim friction-clutch connecting it to the source of power, and a spring for releasing the clutch, in combination with the oscillating shaft, the series of springs each adapted to independently operate said shaft, means whereby said shaft-operating springs may be released by the nail-blanks, and the plunger 35 operated by said shaft and causing the release of the clutch-spring, substantially as specified.

16. The combination with the yielding devices operated by the nail-blanks, of positioning-rods 113 joined to the yielding devices, the plungers 118, triggers engaging both the rods and the plungers and operated by the former, the springs 119 operating the plungers, sliding yokes 121 operated by the plungers, and a shaft 32 connected to the driving-clutch, and having cranks operated by said plungers, substantially as specified.

17. The combination with the yielding devices operated by bent or deformed nail-blanks of positioning-rods 113 113 adapted to be operated by hand in returning the yielding devices to normal position, substantially as specified.

18. The combination with the yielding devices operated by bent or deformed nail-blanks, and hinged as specified, of positioning-rods 113 supported in a swiveled bearing 114, substantially as specified.

19. The combination with the yielding devices operated by bent or deformed blanks and hinged as specified, of positioning-rods 113, supported in a swiveled bearing, and projecting from that bearing so they may be operated by hand in returning the yielding devices, substantially as specified.

20. The combination with a series of yielding devices operated by bent or deformed blanks, of a series of positioning-rods 113, all adapted to be operated by hand in returning the yielding devices, the spring-operated plungers 118, means whereby the positioning-rods control the plungers, and means whereby the plungers individually control the driving-clutch of the machine, substantially as specified.

21. The combination with a series of yielding devices operated by bent or deformed blanks, of a series of positioning-rods 113, all adapted to be operated by hand in returning the yielding devices, the spring-operated plungers 118 having inclines 120, the yokes 121 connected to oscillating shaft 32, said shaft, and connections between said shaft and the driving-clutch of the machine, substantially as specified.

22. The combination with a pair of reduction-rolls, of a nail passage-way extending downward from said rolls and having a head 110 forming part of the walls of the passage, a swinging support for said head, and means for yieldingly holding the support in its normal position, substantially as specified.

23. The combination with a pair of reduction-rolls of a nail-passage receiving the nail from the rolls and having a head 110 forming part of the walls of the passage, a swinging support for said head, and means for yieldingly holding the support in its normal position, substantially as specified.

24. The combination with a pair of reducing-rolls of a nail-passage receiving the nail from said rolls, said passage having a head 110 forming part of the walls of the passage, a support for said head swinging upon an axis located at a distance laterally from the passage, so that the initial movement of the head will be downward, and means for yieldingly holding the support in its normal position, substantially as specified.

25. The transfer-passages for transferring the blanks in a horse-nail machine embodying half-tubes in which the spiral way is formed, and holders in each of which one of said tubes is removably secured, said holders being also removably supported, substantially as specified.

26. The transfer-passages for transferring the blanks between the operating devices of a horse-nail machine, such passages embracing half-tubes such as 96, each removably secured in a holder such as 104, and said holders being both separably and removably supported, substantially as specified.

27. The transfer-passage for transferring the blanks between the reduction-rolls of a horse-nail machine, consisting of half-tubes 96, holders 104 in which the half-tubes are changeably secured, the strap 134 and wedging-key 135, substantially as specified.

28. The combination with the transfer-passage of a horse-nail machine with a yielding device in the wall of the passage for tripping the machine when the blank exerts abnormal pressure thereon, said yielding device serving when operated by the blank to open the passage sufficiently to permit the removal of the offending blank, substantially as specified.

29. Duplicate passage-ways for the nail-blanks formed by half-tubes 96, a separate holder for each of two of said tubes, and a double holder for the other two, and means for detachably locking said holders together, in combination with yielding devices in the walls of said ways adapted to yield to abnormal pressure, said holders being accessible without removal of the yielding devices, substantially as specified.

30. Duplicate passage-ways for the nail-blanks formed by half-tubes 96, a separate holder for each of two of said tubes, and a double holder for the other two, and means for separably locking said holders together, said holders being also located at the front of the machine so they are readily accessible, substantially as specified.

31. The combination with the feed-rolls acting to feed the rod the length of a blank and then to let go of the rod, of opening and closing clamping-blocks 3 3 acting to prevent recoil of the rod, substantially as specified.

32. The combination with the feed-rolls acting to feed the rod the length of a blank and then to let go of the rod, of opening and closing clamping-blocks 3 3 acting to prevent recoil of the rod and also acting to take out the curl in the rod, substantially as specified.

33. The horse-nail machine having safety rod-clamping devices acting to arrest the nail-rod, a movable device operated by the clogging blank or blanks, and a train of mechanism whereby said movable device causes the closing of the clamping devices, substantially as specified.

34. The horse-nail machine having safety rod-clamping devices acting to arrest the nail-rod, a movable device such as the shoe 16 at the side of the passage traversed by the blanks, a motor device for closing the clamping devices, and means whereby the yielding of the shoe throws said motor device into action, substantially as specified.

35. The horse-nail machine having a safety rod-clamp consisting of a stationary and a movable jaw, a weighted lever 10 and a toggle 9 for operating said movable jaw, a lever 15 for holding the toggle out of action, a movable device 16 at the side of the passage traversed by the blanks, and levers carrying motion from said shoe to lever 15, substantially as specified.

36. The combination with the feed-rolls and reduction-rolls, of safety mechanism for arresting the rod, located above the feed-rolls and thrown into operation by clogging in the passage between said feed and said reduction rolls, substantially as specified.

37. The combination with the feed-rolls, of automatic mechanism for arresting the nail-rod when clogging occurs, and automatic mechanism for stopping the machine when the end of the rod is reached, substantially as specified.

38. The horse-nail machine wherein are combined a stationary knife, a movable knife located in a plane below that of the stationary knife, and having a period of rest on the completion of the severing, whereby the movable knife is enabled to assist in keeping the severed blank vertical, and a cam for thus actuating the movable knife, substantially as specified.

39. The horse-nail machine wherein are combined an upper stationary knife and a lower movable knife, and actuating means for the latter consisting of a cam adapted to give it a period of rest at the completion of the severation, substantially as and for the purpose set forth.

40. The combination with the way or passage for the blank leading downward from the knives, of a movable knife acting to contract said way on the completion of the severation for a time sufficient to prevent the severed blank from losing its vertical position, and a cam for actuating said knife and giving it a period of rest, substantially as specified.

41. The combination with the turn-plate of a passage delivering the blanks thereto and provided with a door or gate on the side toward which the blanks are carried by the turn-plate adapted to yield to any blank projecting from the turn-plate, substantially as specified.

42. The combination with the turn-plate of a passage delivering the blanks thereto and provided with a door or gate on the side toward which the blanks are carried by the turn-plate adapted to yield to any blank projecting from the turn-plate, and connections between said door and the driving-clutch of the machine, whereby the machine is automatically stopped by the opening of said door, substantially as specified.

43. The combination with the turn-plate of a passage delivering the blanks thereto and provided with a door or gate on the side toward which the blanks are carried by the turn-plate adapted to yield to any blank projecting from the turn-plate, a lever 145 extending across the door and connections from said lever to the driving-clutch, whereby the machine is automatically stopped by the opening of said door, substantially as specified.

44. The combination with the turn-plate of a passage delivering the blanks thereto and provided with a door or gate on the side toward which the blanks are carried by the turn-plate adapted to yield to any blank projecting from the turn-plate, a lever 145 extending across and operated by the door, and connections between said lever and oscillating shaft 32 of the stop mechanism and whereby said lever operates said shaft, substantially as specified.

45. The combination with the turn-plate of a passage delivering the blanks thereto and provided with a door or gate on the side toward which the blanks are carried by the turn-plate adapted to yield to any blank projecting from the turn-plate, a lever 145 extending across and operated by the door, and connections between said lever and oscillating shaft 32 of the stop mechanism, such connections embracing a two-part or yielding lever adapted to yield when the power put upon it is unusual, substantially as and for the purpose set forth.

46. The combination with the turn-plate of a passage delivering the blanks thereto and provided with a door or gate on the side toward which the blanks are carried by the turn-plate adapted to yield to any blank projecting from the turn-plate, a lever extending across and operated by the door, and connections between said lever and oscillating shaft 32, such connections embracing a lever 145 and 149, both parts of which are pivoted at 146 and one part of which is normally locked to the other by a spring-pressed pin, substantially as specified.

47. The turn-plate having radial sockets to receive the nails, in combination with the slide 153 for ejecting the nails, and means for operating said slide embracing the adjustable lever 161 having an adjustable fulcrum, substantially as specified.

48. The turn-plate having radial sockets to receive the nails, in combination with the slide 153 for ejecting the nails, and means for operating said slide embracing the adjustable lever 161 having an adjustable box carrying the fulcrum on which the lever swings, substantially as specified.

49. The combination with the turn-plate and the slide for ejecting the nails from the plate, of the plunger for actuating the slide, and mechanism for operating the plunger embracing the adjustable lever 161, substantially as specified.

50. The combination with the turn-plate and the slide for ejecting the nails from the plate, of the plunger for actuating the slide consisting of the bar 164 and tube 177, and mechanism for operating the plunger, substantially as specified.

51. The combination with the turn-plate and the slide for ejecting the nails from the plate, of the plunger for actuating the slide consisting of bar 164 and a tube into which the bar is prevented from telescoping by a fastening adapted to yield in case of unusual resistance, and mechanism for operating said plunger, substantially as specified.

52. The combination with the turn-plate and the slide for ejecting the nails from the plate, of the plunger for actuating the slide consisting of bar 164 and a tube in which the end of the bar is secured by a fastening adapted to yield and allow the bar to telescope in the tube in case the slide encounters any unusual resistance, and means for operating said plunger, substantially as specified.

53. The combination with the turn-plate and the slide for ejecting the nails from the plate, of the plunger for actuating the slide consisting of bar 164 and tube 177, said tube having its end clamped upon the bar by a ring, so that both will move together unless unusual resistance is encountered, and means for operating the plunger, substantially as specified.

54. The combination with the turn-plate and the slide for ejecting the nails from the plate, of the plunger for actuating the slide consisting of bar 164 and tube 177 having a cushioning-spring 480, means for securing the end of the bar in the tube and preventing telescoping under ordinary circumstances, and means for operating the plunger, substantially as specified.

55. The combination with the turn-plate and the slide for ejecting the nails from the plate, of the plunger for actuating the slide, means for operating the plunger and means whereby said plunger may stop the machine in case any unusual resistance is encountered by the slide, substantially as specified.

56. The combination with the turn-plate, the slide for ejecting nails from the plate, and the plunger operating the slide and made in two parts adapted to telescope in case unusual resistance is met by the slide, of means whereby the plunger will if thus telescoped cause the stoppage of the machine, substantially as specified.

57. The combination with the turn-plate, the slide for ejecting nails from the plate, and the plunger operating the slide and made in two parts adapted to telescope in case unusual resistance is met by the slide, of the cam-arm 181, latch 182 positioned by said arm, tappet 183 causing the operating of shaft 32 and its connections, and said shaft and connections, substantially as specified.

58. The combination with the ejecting-slides, the turn-plate and its center-piece, of the plunger, means actuating the plunger in its return movements and a cushioning-spring 199 acting on the plunger, substantially as specified.

59. The combination with the turn-plate and the slides, of the removable slide-retaining ring, and the removable center-pin 196, giving opportunity for the removal of the slides through the center of the plate, substantially as specified.

60. The combination with the turn-plate, the nail-ejectors, and the chain 212, of a series of heading-dies made in two parts loosely held in the chain and receiving the nails from the turn-plate, substantially as specified.

61. The combination with the turn-plate, the nail-ejectors, and the chain 212, of a series of heading-dies made in two parts and confined in sockets in the chain-links permitting them to move toward and apart from each other, whereby the entrance and discharge of the blanks is facilitated, substantially as specified.

62. The combination with the turn-plate, the heading-dies, and a latch 226 and ratchet 227 for imparting intermittent motion to the plate and dies, of a pawl 240 and ratchet 241 having its teeth reversed from those of ratchet 227, and serving to prevent excess motion, substantially as specified.

63. The combination with the turn-plate, the heading-dies, and a latch 226 and ratchet 227 for imparting intermittent motion to the plate and dies, of a pawl 240 and ratchet 241 having its teeth reversed from those of ratchet 227, and a friction brake mechanism acting on the ratchet-shaft, substantially as specified.

64. The combination with the shaft carrying the ratchet whereby the intermittent movements are imparted to the turn-plate and heading-dies, of an index-wheel 250 having its teeth sloping from front to rear, a latch engaging such wheel and mechanism for positively operating such latch, substantially as specified.

65. The combination with the shaft carrying the ratchet whereby the intermittent movements are imparted to the turn-plate and heading-dies, of an index-wheel 250 having its teeth sloping from front to rear, a latch having its point beveled in opposite directions and engaging said wheel, and mechanism for positively operating such latch, substantially as specified.

66. The combination with the shaft carrying the ratchet whereby the intermittent movements are imparted to the turn-plate and heading-dies, of an index-wheel 250 having its teeth sloping from front to rear, a latch engaging such wheel and provided with a depressing-spring, and mechanism for positively operating said latch, substantially as specified.

67. The combination with the shaft carrying the ratchet whereby the intermittent movements are imparted to the turn-plate and heading-dies, of an index-wheel 250 having its teeth sloping from front to rear, a latch having its point beveled in opposite directions and engaging said wheel, and also provided with a depressing-spring, and mechanism for positively operating said latch, substantially as specified.

68. The combination with the turn-plate having openings in its side, of index-finger 260 entering such openings and correcting improper positioning of the plate, and means for operating said finger at proper times, substantially as specified.

69. The combination with the turn-plate having openings in its side, of finger 260 entering such openings and correcting improper positioning of the plate, the plunger 177 and means whereby the plunger operates said finger, substantially as specified.

70. The combination with the turn-plate and its actuating devices of means for preventing overthrow in the movements of the plate, and means for correcting improper positioning of the plate, substantially as specified.

71. The combination with the turn-plate and its actuating devices, of means for preventing overthrow in the movements of the plate, consisting of pawl 240 and ratchet 241, and the index-wheel and latch, and means for correcting improper positioning of the plate, substantially as specified.

72. The combination with the turn-plate and its actuating devices, of pawl 240 and ratchet 241, the index-wheel and latch, and the brake, substantially as specified.

73. The combination with the turn-plate and its actuating devices, of pawl 240 and ratchet 241, the index-wheel and latch and the finger 260 entering openings in the plate, substantially as specified.

74. The combination with the heading-dies and chain and the sprocket 213 located at the receiving end of the chain, of friction means acting on the nails as they are delivered to the dies and holding them therein, substantially as specified.

75. The combination with the heading-dies and chain and sprocket 213, of springs 271, acting on the points of the nails within the wheel, substantially as specified.

76. The combination with the heading-dies made in movable parts and the finishing-dies, of means for locking the heading-dies together during the operation of the finishing-dies, substantially as specified.

77. The combination with the heading-dies made in parts as set forth and the finishing-dies, of means for locking two consecutive sets of the dies together during the operation of the finishing-dies, substantially as specified.

78. The combination with the opening and closing heading-dies and their carrying-chain and the finishing-dies, of oppositely-acting toggles for closing two consecutive sets of said dies, substantially as specified.

79. The combination with the opening and closing heading-dies and their carrying-chain and the finishing-dies, of oppositely-acting toggles for closing two consecutive sets of said dies, and the abutment-block 280 entering between the two sets of dies, substantially as specified.

80. The combination with the opening and closing heading-dies and their carrying-chain and the finishing-dies, of oppositely-acting toggles for closing two consecutive sets of said dies, and the abutment-block 280 entering between the two sets of dies, said abutment-block and finishing-dies being carried by the same frame, substantially as specified.

81. The combination with the opening and closing heading-dies and their carrying-chain and the finishing-dies, of oppositely-acting toggles for closing two consecutive sets of said dies, one member of each toggle being longer than the other, and power mechanism acting on said long members to straighten the toggles, substantially as specified.

82. The combination with the heading-dies and the toggles, of means for positioning the points of one member of each, so they will act on the dies, substantially as specified.

83. The combination with the heading-dies and the toggles, of means for positioning the points of one member of each so they will act on the dies, and power mechanism for straightening the toggles.

84. The combination with the heading-dies, the toggles and the abutment-block, of means for positioning the points of one member of each toggle so it will act on the dies, means for positioning the block, and power mechanism for straightening the toggles, substantially as specified.

85. The combination with the heading-dies, the toggles and the power mechanism actuating the latter, of lifting-springs attached to the ends of the toggle members whose points are to be positioned in the dies, substantially as specified.

86. The combination with the heading-dies, the toggles having one long and one short member, and power mechanism acting on the long members, of a spring acting on the long members and causing their points to move quickly into position in the dies, substantially as specified.

87. The combination with a toggle, one member of which is stationarily pivoted at its outer end, and the other member of which is movable at its outer end to carry said end into and out of its acting position, of the heading devices and mechanism for straightening said toggle and means for causing a quick positioning movement by said movable end, substantially as specified.

88. The combination with the heading-dies and their chain, of a discharging-plunger acting on the nail while held head downward in the dies, and provided with a spring allowing it to yield to the nail, substantially as specified.

89. The combination with the heading-dies and their chain, of a discharging-plunger acting on the point end of the nails, and having its acting end recessed conically, substantially as specified.

90. The combination with the heading-dies and their chain, of means for discharging the nails, and means for stopping the machine in case of failure to discharge them, substantially as specified.

91. The combination with the nail-discharging mechanism of a nail-machine, of means for stopping the machine set in operation by any nail which fails to be discharged, substantially as specified.

92. The combination with the die-chain of rock-shaft carrying contacts 350 and 351, and connections between said shaft and the driving-clutch, substantially as specified.

93. The combination with the header-dies, header-chain and sprockets, the ratchet 227 and its latch 226, of the sliding yoke or head 222, and its actuating-cam, substantially as specified.

94. The combination with header-dies, header-chain and sprockets, the reversed ratchets 227 and 241 of the yoke or head 222, the latches 226 and 240 both borne by said yoke, and means for reciprocating said yoke, substantially as specified.

95. The combination with header-dies, header-chain, sprockets and shafts 228 of reversed ratchets 227 and 241, sliding yoke or head 222, latches 226 and 240 both carried by said yoke, and means for reciprocating the yoke, substantially as specified.

96. The transfer tube or passage having a yielding device acted upon by offending blanks and adapted when actuated by a blank to move away from and uncover the passage sufficiently to give access to the blank, substantially as specified.

97. The combination with the shafts 157 and 228, of means for converting the continuous motion of the former to intermittent motion and communicating it to shaft 228, and means for preventing overthrow in the intermittent movements, consisting of the ratchet 241, stop-latch 240, and the index-wheel and pawl, substantially as specified.

98. The combination with the shafts 157 and 228, of means for converting the continuous motion of the former to intermittent motion and communicating it to shaft 228, and means for preventing overthrow in the intermittent movements, consisting of the ratchet 241, stop-latch 240, the index-wheel and pawl, and the brake mechanism, substantially as specified.

99. The combination with the toggle for locking the heading-dies, of means for positioning the point of one of the toggle members between the dies, and means for rendering said positioning means quick or slow in action as desired, substantially as specified.

100. The combination with the toggle 289 and 290 for locking the heading-dies, of an adjustable stationary support for the outer end of one of the toggle members, substantially as specified.

101. In a horse-nail machine, the combination of duplicate nail-passages arranged side by side and receiving nails from the rolls, duplicate devices one in each passage adapted to yield to offending blanks and operating independently of each other, and mechanism for stopping the machine common to both said yielding devices and adapted to be set in operation by either of them, substantially as specified.

102. In a horse-nail machine, the combination of duplicate nail-passages arranged side by side and receiving nails from the rolls, duplicate devices one at each passage adapted to yield to offending blanks and operating independently of each other, and each acting to open its passage so as to permit the removal of the offending blank, and mechanism for stopping the machine common to both said yielding devices and adapted to be set in operation by either of them, substantially as specified.

BENJAMIN J. ABBOTT.

Witnesses:
 EDW. S. EVARTS,
 H. M. MUNDAY.